US011006327B2

(12) United States Patent
Raghunathan et al.

(10) Patent No.: US 11,006,327 B2
(45) Date of Patent: May 11, 2021

(54) VOICE CALL MANAGEMENT TECHNIQUES IN WIRELESS COMMUNICATIONS

(71) Applicant: QUALCOMM Incorporated, San Diego, CA (US)

(72) Inventors: Shravan Kumar Raghunathan, San Diego, CA (US); Srinivasan Balasubramanian, San Diego, CA (US); Parthasarathy Krishnamoorthy, San Diego, CA (US); Chetan Chakravarthy, San Diego, CA (US); Yonas Kidane, San Diego, CA (US); Arvindhan Kumar, San Diego, CA (US); Kumarabhijeet Singh, San Diego, CA (US); Krishna Rao Mandadapu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 16/144,696

(22) Filed: Sep. 27, 2018

(65) Prior Publication Data
US 2019/0150039 A1 May 16, 2019

Related U.S. Application Data

(60) Provisional application No. 62/573,960, filed on Oct. 18, 2017.

(51) Int. Cl.
*H04W 36/00* (2009.01)
*H04W 36/30* (2009.01)
(Continued)

(52) U.S. Cl.
CPC ..... *H04W 36/0027* (2013.01); *H04L 65/4007* (2013.01); *H04M 1/2535* (2013.01);
(Continued)

(58) Field of Classification Search
CPC ............. H04W 36/0027; H04W 76/19; H04W 28/0236; H04W 36/305; H04W 76/18;
(Continued)

(56) References Cited

U.S. PATENT DOCUMENTS

2011/0286321 A1  11/2011 Sureshchandran et al.
2013/0142116 A1* 6/2013 Prakash ................ H04W 16/14
                                                    370/328
(Continued)

FOREIGN PATENT DOCUMENTS

EP          2919505 A1     9/2015
WO    WO-2013167204 A1    11/2013

OTHER PUBLICATIONS

Das D., et al., "Evaluation of mobile handset recovery from radio link failure in a multi-RATS environment", Internet Multimedia Services Architecture and Applications, 2008, IMSAA 2008, 2nd International Conference on, IEEE, Piscataway, NJ, USA, Dec. 10, 2008 (Dec. 10, 2008), pp. 1-6, XP031408578, ISBN: 978-1-4244-2684-3.
(Continued)

*Primary Examiner* — Walter J Divito
(74) *Attorney, Agent, or Firm* — Linda G. Gunderson; Holland & Hart LLP

(57) ABSTRACT

Methods, systems, and devices for wireless communications are described that provide for call continuity following radio link failure (RLF) through re-establishment of a voice call using a same or different radio access technology (RAT) before the call is dropped. Upon detection of RLF on a connection supporting a voice call, a UE may initiate a drop call timer and scan for available connections. The voice call may be attempted to be re-established if a connection is available on using a RAT of an existing connection. The voice call in such cases may continue without the call being dropped. Upon expiration of the drop call timer, the UE may
(Continued)

attempt to establish a connection using a RAT identified during the duration of the drop call timer.

26 Claims, 14 Drawing Sheets

(51) Int. Cl.
    *H04W 76/19*     (2018.01)
    *H04L 29/06*     (2006.01)
    *H04M 1/253*     (2006.01)
    *H04W 28/02*     (2009.01)
    *H04W 76/18*     (2018.01)
    *H04W 72/12*     (2009.01)

(52) U.S. Cl.
    CPC ..... *H04W 28/0236* (2013.01); *H04W 36/305* (2018.08); *H04W 76/19* (2018.02); *H04W 72/1215* (2013.01); *H04W 76/18* (2018.02)

(58) Field of Classification Search
    CPC .......... H04W 72/1215; H04L 65/4007; H04M 1/2535
    See application file for complete search history.

(56) References Cited

U.S. PATENT DOCUMENTS

2013/0182563 A1     7/2013   Johansson et al.
2015/0181483 A1*   6/2015   Tabet .................... H04W 76/10
                                                            370/252
2019/0182689 A1*   6/2019   Martin .............. H04W 36/0069

OTHER PUBLICATIONS

International Search Report and Written Opinion—PCT/US2018/053580—ISA/EPO—dated Oct. 24, 2019.

* cited by examiner

VOICE CALL MANAGEMENT TECHNIQUES IN WIRELESS COMMUNICATIONS

CROSS REFERENCES

The present application for patent claims the benefit of U.S. Provisional Patent Application No. 62/573,960 by RAGHUNATHAN, et al., entitled "VOICE CALL MANAGEMENT TECHNIQUES IN WIRELESS COMMUNICATIONS," filed Oct. 18, 2017, assigned to the assignee hereof, and expressly incorporated by reference.

BACKGROUND

The following relates generally to wireless communication, and more specifically to voice call management techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some situations, a UE may be connected to a wireless system, and may experience a radio link failure (RLF) in which the connection fails and the UE may attempt to re-establish a connection. In cases where a user is in a voice call when RLF occurs, it may result in the call being dropped, which can result in a poor user experience due to the inconvenience of having to re-dial the call, and the like. In some cases, if another party to the call is talking and does not realize the call was dropped, or if multiple parties are on a call (e.g., in a conference call), the user may miss some important information that was discussed before being able to re-dial the call. Thus, reducing a number of dropped calls experienced by users of a wireless system would be desirable.

SUMMARY

The described techniques relate to improved methods, systems, devices, or apparatuses that support voice call management techniques in wireless communications. Generally, the described techniques provide for call continuity following radio link failure (RLF) through re-establishment of a voice call using a same or different radio access technology (RAT) before the call is dropped. In some cases, a user equipment (UE) may have concurrent connections to two radio access networks (RANs) that use different RATs and a voice call may be established with a first RAN using a first RAT. In the event of an RLF on the first RAT, the UE may initiate a drop call timer and determine whether the connection with the second RAN remains available for communications. If the UE determines, during the duration of the drop call timer, that the second RAN remains available for communications, the UE may transfer the voice call to the second RAN. The voice call in such cases may continue without the call being dropped. The UE may also monitor for signals of one or more other RATs and, if the second RAT is not available and the drop call timer expires, the UE may attempt to establish a connection with one of the one or more other RATs and may drop the call.

In some cases, a UE may have a single active connection using the first RAT, which may experience an RLF during a voice call. In such cases, the UE may initiate the drop call timer and attempt to re-establish a connection using the first RAT. If the connection is able to be re-established during a duration of the drop call timer, the UE may transfer the voice call to the re-established connection to avoid dropping the call. Concurrently with attempting to re-establish the connection using the first RAT, the UE may scan for other available RATs that may support a connection and, upon expiration of the drop call timer, the UE may attempt to establish a new connection using a RAT different than the first RAT and may drop the call. In some cases, a list of cells that are more likely to experience a fast RLF may be stored at the UE, and the UE may perform a technique as described herein if the RLF occurs when the UE is connected to one of the cells in the list.

A method of wireless communication is described. The method may include establishing a first connection with a first RAN using a first RAT and a concurrent second connection with a second RAN using a second RAT, establishing a voice call using the first connection, determining that a RLF has occurred for the first connection, initiating a drop call timer and a connection re-establishment timer responsive to the determining that the RLF has occurred for the first connection, determining, during a duration of the drop call timer, whether the second connection remains available for wireless communications, and switching the voice call to the second connection responsive to determining that the second connection remains available for wireless communications.

An apparatus for wireless communication is described. The apparatus may include means for establishing a first connection with a first RAN using a first RAT and a concurrent second connection with a second RAN using a second RAT, means for establishing a voice call using the first connection, means for determining that a RLF has occurred for the first connection, means for initiating a drop call timer and a connection re-establishment timer responsive to the determining that the RLF has occurred for the first connection, means for determining, during a duration of the drop call timer, whether the second connection remains available for wireless communications, and means for switching the voice call to the second connection responsive to determining that the second connection remains available for wireless communications.

Another apparatus for wireless communication is described. The apparatus may include a processor, memory in electronic communication with the processor, and instructions stored in the memory. The instructions may be operable to cause the processor to establish a first connection with a first RAN using a first RAT and a concurrent second connection with a second RAN using a second RAT, establish a voice call using the first connection, determine that a RLF has occurred for the first connection, initiate a drop call timer and a connection re-establishment timer responsive to the determining that the RLF has occurred for the first connection, determine, during a duration of the drop call timer, whether the second connection remains available for wireless communications, and switch the voice call to the second connection responsive to determining that the second connection remains available for wireless communications.

A non-transitory computer-readable medium for wireless communication is described. The non-transitory computer-readable medium may include instructions operable to cause a processor to establish a first connection with a first RAN using a first RAT and a concurrent second connection with a second RAN using a second RAT, establish a voice call using the first connection, determine that a RLF has occurred for the first connection, initiate a drop call timer and a connection re-establishment timer responsive to the determining that the RLF has occurred for the first connection, determine, during a duration of the drop call timer, whether the second connection remains available for wireless communications, and switch the voice call to the second connection responsive to determining that the second connection remains available for wireless communications.

Some examples of the method, apparatus, and non-transitory computer-readable medium described above may further include processes, features, means, or instructions for identifying that a third RAN using a third RAT may be available for a wireless connection responsive to determining that the second connection may be unavailable for wireless communications. Some examples of the method, apparatus, and non-transitory computer-readable medium described above may further include processes, features, means, or instructions for attempting to re-establish the first connection with the first RAN during the duration of the drop call timer. Some examples of the method, apparatus, and non-transitory computer-readable medium described above may further include processes, features, means, or instructions for establishing a third connection with the third RAN using the third RAT responsive to an expiration of the drop call timer.

Some examples of the method, apparatus, and non-transitory computer-readable medium described above may further include processes, features, means, or instructions for identifying that a connection the first RAN may be available during the duration of the drop call timer. Some examples of the method, apparatus, and non-transitory computer-readable medium described above may further include processes, features, means, or instructions for transmitting a connection re-establishment request to the first RAN responsive to the identifying that the first RAN may be available during the duration of the drop call timer. Some examples of the method, apparatus, and non-transitory computer-readable medium described above may further include processes, features, means, or instructions for re-establishing the first connection responsive to the re-establishment request. Some examples of the method, apparatus, and non-transitory computer-readable medium described above may further include processes, features, means, or instructions for re-establishing the voice call using the re-established first connection.

Some examples of the method, apparatus, and non-transitory computer-readable medium described above may further include processes, features, means, or instructions for caching information indicative of the third RAN during the duration of the drop call timer; where establishing the third connection is based at least in part on the cached information.

Some examples of the method, apparatus, and non-transitory computer-readable medium described above may further include processes, features, means, or instructions for identifying that a cell ID of a cell that serves the first connection may be included in a list of cell IDs that may be more likely to may have RLF. Some examples of the method, apparatus, and non-transitory computer-readable medium described above may further include processes, features, means, or instructions for performing the switching responsive to the identifying the cell ID may be included in the list of cell IDs.

In some examples of the method, apparatus, and non-transitory computer-readable medium described above, the switching the voice call to the second connection may include transmitting a session initial protocol (SIP) invite for the voice call to the second RAN via the second connection. Some examples of the method, apparatus, and non-transitory computer-readable medium described above may further include processes, features, means, or instructions for re-establishing the voice call on the second connection.

In some examples of the method, apparatus, and non-transitory computer-readable medium described above, the first RAT may be a 5G or new radio (NR) RAT and the second RAT may be a 4G or long term evolution (LTE) RAT. In some examples of the method, apparatus, and non-transitory computer-readable medium described above, the first RAT may be a 4G or LTE RAT and the second RAT may be a 5G or NR RAT.

A method of wireless communication is described. The method may include establishing a first connection with a first RAN using a first RAT, establishing a voice call using the first connection, determining that a RLF has occurred for the first connection, initiating a drop call timer responsive to the determining that the RLF has occurred for the first connection, identifying that a second RAN using a second RAT is available for a wireless connection responsive to determining the RLF, attempting to re-establish the first connection with the first RAN during a duration of the drop call timer, and attempting to establish a second connection with the second RAN responsive to an expiration of the drop call timer.

An apparatus for wireless communication is described. The apparatus may include means for establishing a first connection with a first RAN using a first RAT, means for establishing a voice call using the first connection, means for determining that a RLF has occurred for the first connection, means for initiating a drop call timer responsive to the determining that the RLF has occurred for the first connection, means for identifying that a second RAN using a second RAT is available for a wireless connection responsive to determining the RLF, means for attempting to re-establish the first connection with the first RAN during a duration of the drop call timer, and means for attempting to establish a second connection with the second RAN responsive to an expiration of the drop call timer.

Another apparatus for wireless communication is described. The apparatus may include a processor, memory in electronic communication with the processor, and instructions stored in the memory. The instructions may be operable to cause the processor to establish a first connection with a first RAN using a first RAT, establish a voice call using the first connection, determine that a RLF has occurred for the first connection, initiate a drop call timer responsive to the determining that the RLF has occurred for the first connection, identify that a second RAN using a second RAT is available for a wireless connection responsive to determining the RLF, attempt to re-establish the first connection with the first RAN during a duration of the drop call timer, and attempt to establish a second connection with the second RAN responsive to an expiration of the drop call timer.

A non-transitory computer-readable medium for wireless communication is described. The non-transitory computer-readable medium may include instructions operable to cause a processor to establish a first connection with a first RAN using a first RAT, establish a voice call using the first connection, determine that a RLF has occurred for the first connection, initiate a drop call timer responsive to the determining that the RLF has occurred for the first connection, identify that a second RAN using a second RAT is available for a wireless connection responsive to determining the RLF, attempt to re-establish the first connection with the first RAN during a duration of the drop call timer, and attempt to establish a second connection with the second RAN responsive to an expiration of the drop call timer.

Some examples of the method, apparatus, and non-transitory computer-readable medium described above may further include processes, features, means, or instructions for identifying that a connection the first RAN may be available during the duration of the drop call timer. Some examples of the method, apparatus, and non-transitory computer-readable medium described above may further include processes, features, means, or instructions for transmitting a connection re-establishment request to the first RAN responsive to the identifying that the first RAN may be available during the duration of the drop call timer. Some examples of the method, apparatus, and non-transitory computer-readable medium described above may further include processes, features, means, or instructions for re-establishing the first connection responsive to the re-establishment request. Some examples of the method, apparatus, and non-transitory computer-readable medium described above may further include processes, features, means, or instructions for re-establishing the voice call using the re-established first connection.

Some examples of the method, apparatus, and non-transitory computer-readable medium described above may further include processes, features, means, or instructions for identifying that a cell ID of a cell that serves the first connection may be included in a list of cell IDs that may be more likely to may have RLF. Some examples of the method, apparatus, and non-transitory computer-readable medium described above may further include processes, features, means, or instructions for performing the initiating the drop call timer and the attempting to re-establish the first connection responsive to the identifying the cell ID may be included in the list of cell IDs.

Some examples of the method, apparatus, and non-transitory computer-readable medium described above may further include processes, features, means, or instructions for initiating a connection re-establishment timer responsive to the determining that the RLF may have occurred for the first connection. Some examples of the method, apparatus, and non-transitory computer-readable medium described above may further include processes, features, means, or instructions for switching to an idle mode responsive to an expiration of the connection re-establishment timer before re-establishment of the first connection or establishment of the second connection. In some examples of the method, apparatus, and non-transitory computer-readable medium described above, the attempting to establish the second connection further includes dropping the voice call.

In some examples of the method, apparatus, and non-transitory computer-readable medium described above, the drop call timer may have a first duration that may be shorter than a second duration of the connection re-establishment timer, and the first duration may be based at least in part on a time a user will wait before dropping the voice call.

Some examples of the method, apparatus, and non-transitory computer-readable medium described above may further include processes, features, means, or instructions for caching information indicative of the second RAN during the duration of the drop call timer; wherein attempting to establish the second connection is based at least in part on the cached information.

DETAILED DESCRIPTION

Figure 1:
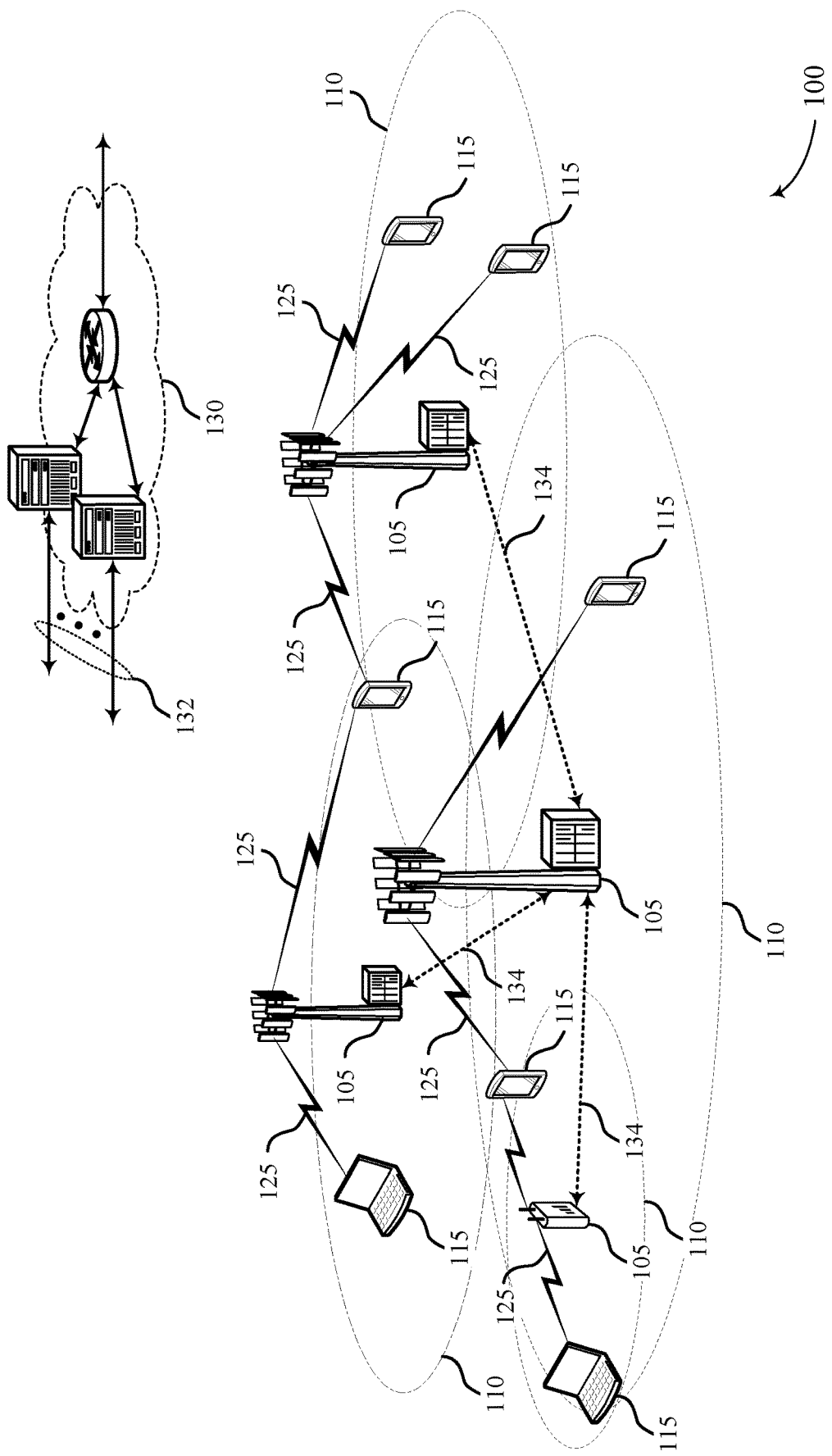
FIG. 1 illustrates an example of a system for wireless communication that supports voice call management techniques in wireless communications in accordance with aspects of the present disclosure.

Various described techniques provide for call continuity of voice calls following radio link failure (RLF) through re-establishment of a voice call using a same or different radio access technology (RAT) before the call is dropped. As indicated above, in some situations a user equipment (UE) may experience an RLF while servicing an active voice call. Such situations may arise, for example, in cases where fast fading occurs in which a connection with a first cell is not able to be handed over to a second cell before the connection with the first cell fails. Such fast fading may occur, for example, if a user of the UE travels through a tunnel or enters an elevator, to name just two examples. When the UE experiences the RLF, the UE may start an RLF timer (e.g., a T311 timer in LTE/NR, a T314 timer in 3G, etc.), and attempt to re-establish a connection during a duration of the RLF timer, which may also be referred to herein as a connection re-establishment timer. In some cases, if the connection is re-established using the same RAT, the UE may perform a cell update procedure or re-establishment procedure and continue the voice call once the connection is re-established (e.g., when the UE receives a cell update confirm for a 3G connection or completes a radio resource control (RRC) connection re-establishment for a 4G or NR connection).

However, in some cases the UE may identify a different RAT than used to establish the voice call is available following the RLF. The UE may attempt to camp on such a different RLF, which will result in the voice call being dropped except in instances where there may happen to be pending network access stratum (NAS) signaling that may allow the call to be transferred. As indicated above, dropping of voice calls results in poor user experiences, user inconveniences, and may increase power consumption at the UE. According to various techniques discussed herein, UEs may be able to maintain call continuity following an RLF in more cases, which may help to enhance user experience and reduce UE power consumption. While various examples are discussed herein with respect to 4G and 5G RATs, the concepts are also applicable to other RATs (e.g., 2G, 3G, 4G, or 5G RATs) or combinations of RATs.

As discussed above, various techniques described herein provide for call continuity of voice calls following RLF. In some cases, a UE may have concurrent connections to two radio access networks (RANs) that use different RATs and a voice call may be established with a first RAN using a first RAT. Such a situation may occur, for example, if a UE is operating in non-stand-alone (NSA) mode with concurrent LTE and NR connections, for example. In the event of an RLF on the first RAT, the UE may initiate a drop call timer, in addition to the RLF timer, and determine whether the connection with the second RAN remains available for communications. If the UE determines, during the duration of the drop call timer, that the second RAN remains available for communications, the UE may transfer the voice call to the second RAN (e.g., using a same Internet protocol (IP) address and voice domain transfer number (VDN), and re-establishing the voice call with a session initiation protocol (SIP) invite to the second RAN). The voice call in such cases may continue without the call being dropped. The UE may also monitor for signals of one or more other RATs and, if the second RAT is not available and the drop call timer expires, the UE may attempt to establish a connection with one or the one or more other RATs and may drop the call.

In some cases, a UE may have a single active connection using the first RAT, which may experience an RLF during a voice call. Such a situation may occur, for example, if a UE is operating in stand-alone (SA) mode with a NR connection. In such cases, the UE may initiate the drop call timer and attempt to re-establish a connection using the first RAT. If the connection is able to be re-established during a duration of the drop call timer, the UE may transfer the voice call to the re-established connection to avoid dropping the call. Concurrently with attempting to re-establish the connection using the first RAT, the UE may scan for other available RATs that may support a connection and, upon expiration of the drop call timer, the UE may attempt to establish a new connection using a different RAT than the first RAT and drop the call.

In some cases, a list of cells that are more likely to experience a fast RLF may be stored at the UE, and the UE may initiate the drop call timer and attempt to re-establish a connection according to techniques described herein if the RLF occurs when the UE is connected to one of the cells in the list. If the RLF occurs at a cell that is not on the list, the UE may simply initiate the RLF timer and attempt to camp on a first available cell irrespective of the RAT of the cell.

Thus, techniques as discussed herein may provide a UE with more time to continue a voice call after an RLF occurs and hence the voice call performance for a UE is improved and the likelihood of dropped calls may be reduced. Techniques as discussed herein may also provide additional power conservation, as the UE will avoid dropping voice calls in some cases, and the user will need to redial fewer calls.

Aspects of the disclosure are initially described in the context of a wireless communications system. Aspects of the disclosure are further illustrated by and described with reference to apparatus diagrams, system diagrams, and flowcharts that relate to voice call management techniques in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or an NR network. In some cases, wireless communications system 100 may support enhanced broadband communications, ultra-reliable (e.g., mission critical) communications, low latency communications, or communications with low-cost and low-complexity devices. UEs 115 and base stations 105 may use techniques such as disclosed herein to maintain continuity of voice calls in some cases.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type). Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, one or more UEs 115 may be used for a voice call and may use one or more techniques as discussed herein to provide for call continuity of voice calls following RLF. In some cases, call continuity may be maintained through re-establishment of a voice call using a same or different RAT that was used to establish the voice call and dropping of the voice call may be avoided.

Figure 2:
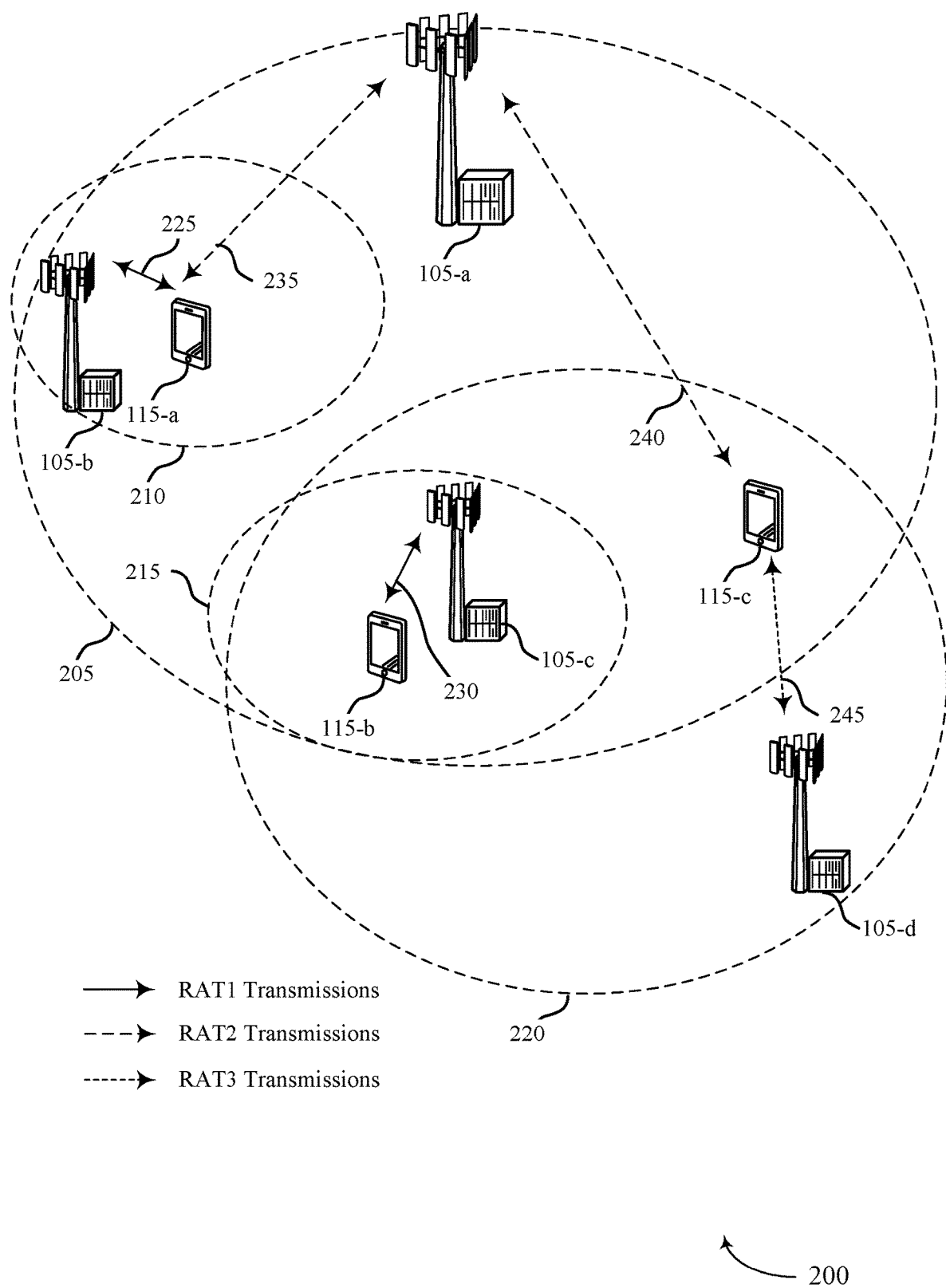
FIG. 2 illustrates an example of a wireless communication system that supports voice call management techniques in wireless communications in accordance with aspects of the present disclosure.

FIG. 2 illustrates an example of a wireless communication system 200 that supports voice call management techniques in wireless communications in accordance with various aspects of the present disclosure. In some examples, wireless communication system 200 may implement aspects of wireless communication system 100. In the example of FIG. 2, the wireless communication system 200 may include a first base station 105-a, a second base station 105-b, a third base station 105-c, and a fourth base station 105-d, which may be examples of base stations 105 of FIG. 1. The wireless communication system 200 may also include a first UE 115-a, a second UE 115-b, and a third UE 115-c, which may be examples of UEs 115 of FIG. 1.

In this example, the first base station 105-a may have a relatively large first geographic coverage area 205 and may provide connections using an LTE RAT. In some cases, the first base station 105-a may provide LTE anchor carrier connections for UEs 115 that may operate in an NSA mode. The second base station 105-b may have a relatively small second geographic coverage area 210 and may provide connections using a NR RAT. Likewise, the third base station 105-c may have a relatively small third geographic coverage area 215. The fourth base station 105-d, in this example, may have a relatively large fourth geographic coverage area 220 and operate according to a different RAT, such as a 2G or 3G RAT.

In the example of FIG. 2, the first UE 115-a may operate in a NSA mode, in which a first connection 225 may be established with the second base station 105-b using a first RAT (e.g., a NR RAT) to connect to a first RAN, and a second connection 235 (e.g., an anchor carrier connection) may be established with the first base station 105-a using a second RAT (e.g., an LTE RAT) to connect to a second RAN. The second UE 115-a in this example may operate in a SA mode in which a connection 230 is established with the third base station 105-c using the first RAT. The third UE 115-c in this example may have a connection 240 to the first base station 105-a using the second RAT. In some cases, the second UE 115-b (or the third UE 115-c), which is within the fourth geographic coverage area 220 of the fourth base station, may establish a connection 245 with the fourth base station 105-d using a third RAT (e.g., a 2G or 3G RAT) in the event that no other connections are available.

In some cases, the first UE 115-a may establish a voice call using the first connection 225 with the second base station 105-b. In the event of an RLF on the first connection 225 after the voice call is established (e.g., if the first UE 115-a enters a tunnel), the first UE 115-a may initiate a drop call timer and determine whether the second connection 235 with the first base station 105-a remains available for communications. If the first UE 115-a determines, during the duration of the drop call timer, that the second connection 235 remains available for communications, the first UE 115-a may transfer the voice call to the second connection 2355. The voice call in such cases may continue without the call being dropped. The first UE 115-a may also monitor for signals of one or more other RATs and, if the second connection is not available and the drop call timer expires, the first UE 115-a may attempt to establish a connection with one or the one or more other RATs and may drop the call.

In some examples, the first RAT may be a NR RAT, and the second RAT may be an LTE RAT and the first UE 115-a may be connected in an NSA mode. In such a case, when there is voice call established using the NR RAT and the first UE 115-a hits RLF due to sudden drop of serving cell coverage, the first UE 115-a may start a connection re-establishment timer (e.g., a T311 timer) and start scanning for all the beams to acquire service on the NR RAT. The first UE 115-a may also scan for other RAT's to see if there is any coverage available. Because the first UE 115-a in this example is operating in NSA mode, the concurrent second connection 235 with an LTE RAT may be checked to determine if the LTE link is active. If the first UE 115-a determines that the second connection 235 is still active, the first UE 115-a may try to move the established voice call to LTE, with a same IP address as voice over (VO) NR and VDN information, so that the voice call gets transferred and re-established with a SIP invite on LTE. In such cases, the voice call may not be dropped and IMS call continuity may be maintained. Thus, the user of the first UE 115-a, even though RLF occurred on the first connection 225, may maintain the voice call. In some cases, a list of one or more cells that are more likely to have fast fading (e.g., cells or base stations that have a relatively high incidence of fast fading within their respective coverage areas) may be cached, and the first UE 115-a may attempt the call continuity technique in cases where the serving cell of the second base station 105-b is on the list. If the serving cell is not on such a list, the first UE 115-a may initiate a re-establishment procedure with a different RAT more quickly, rather than first determining whether the second connection 235 remains present. In other examples, the first UE 115-a may establish a voice call using the second connection 235 and the second RAT, and in the event of RLF on the second connection 235, may attempt to perform IMS voice call continuity using the first connection 225 on the first RAT by using the same IP address and VDN information.

In some cases, the first UE 115-a, upon RLF of the first connection 225, may find another neighbor cell that uses a third RAT. In such cases, the first UE 115-a may follow the connection re-establishment timer (e.g., a network configured T311 timer) and wait until a configurable internal timer, referred to as a drop call timer ($T_d$) herein, expires before camping on the neighbor cell. In some cases, the duration of $T_d$ may correspond to a time where an average user will drop the voice call. Thus, even if the neighbor cell is available, the first UE 115-a will not camp on the neighbor cells, because moving to the new cell on the different RAT will result in the established voice call being dropped. In such cases, the first UE 115-a may cache the found neighbor cells on the different RAT(s) for further use in the event that $T_d$ expires before the first UE 115-a can re-establish the voice call. In the case where the first UE 115-a is able to get the service on the first RAT before the drop call timer ($T_d$) expiry, it will send an RRC connection re-establishment request, to which the first RAN may respond by sending an RRC connection re-establishment and the voice call will continue without being dropped. If the first UE 115-a does not find a cell serving the first RAT during the duration of $T_d$, the first UE 115-a may camp on the found neighbor cell using the third RAT and will drop the call.

In some cases, upon RLF, a UE 115 may identify another neighbor cell, and attempt to maintain call continuity of a voice call by using the neighbor cell. For example, the second UE 115-b or the third UE 115-c may operate in SA mode and experience RLF during a voice call and may identify one or more of the first base station 105-a or the fourth base station 105-d. Examples of call continuity in such cases will be discussed with reference to the example of FIGS. 3A and 3B.

Figure 3A:
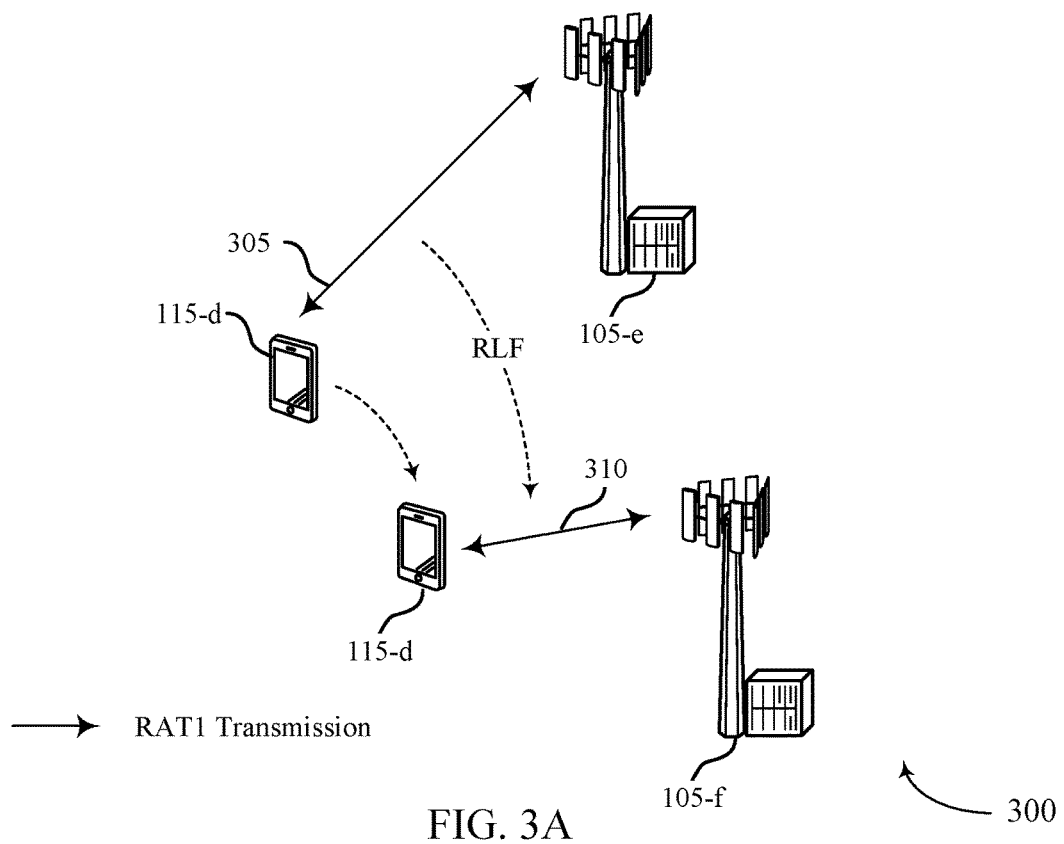
FIG. 3A illustrates an example of a connection re-establishment using a same radio access technology (RAT) that supports voice call management techniques in wireless communications in accordance with aspects of the present disclosure.

FIG. 3A illustrates an example 300 of a connection re-establishment using a same RAT that supports voice call management techniques in wireless communications in accordance with various aspects of the present disclosure. In the example of FIG. 3A, a UE 115-d, which may be an example of a UE 115 of FIG. 1 or 2, may establish a first connection 305 using a first RAT with a first base station 105-e, which may be an example of a base station 105 of FIG. 1 or 2. The UE 115-d may experience RLF on the first connection 305, and may start a connection re-establishment timer (e.g., a network configured T311 timer) and a drop call timer (TO. In some cases, the drop call timer (Ta) may be a configurable internal timer, having a duration that may correspond to a time where an average user will drop the voice call. The UE 115-d may then start scanning for available connections.

In the event that the UE 115-d identifies that a connection may be available that uses a different RAT than the first RAT, the UE 115-d will not camp on the neighbor cells, because moving to the new cell on the different RAT will result in the established voice call being dropped. In such cases, the UE 115-d may cache the found neighbor cells on the different RAT(s) for further use in the event that $T_d$ expires before the UE 115-d can re-establish the voice call. In the case where the UE 115-d is able to get the service on the first RAT, such as through second base station 105-f, before the drop call timer ($T_d$) expiry, the UE 115-d may establish a second connection 310 with the second base station 105-f using the first RAT (e.g., the UE 115-d may transmit an RRC connection re-establishment request, to which the first RAN may respond by sending a RRC connection re-establishment) and the voice call will continue without being dropped.

Figure 3B:
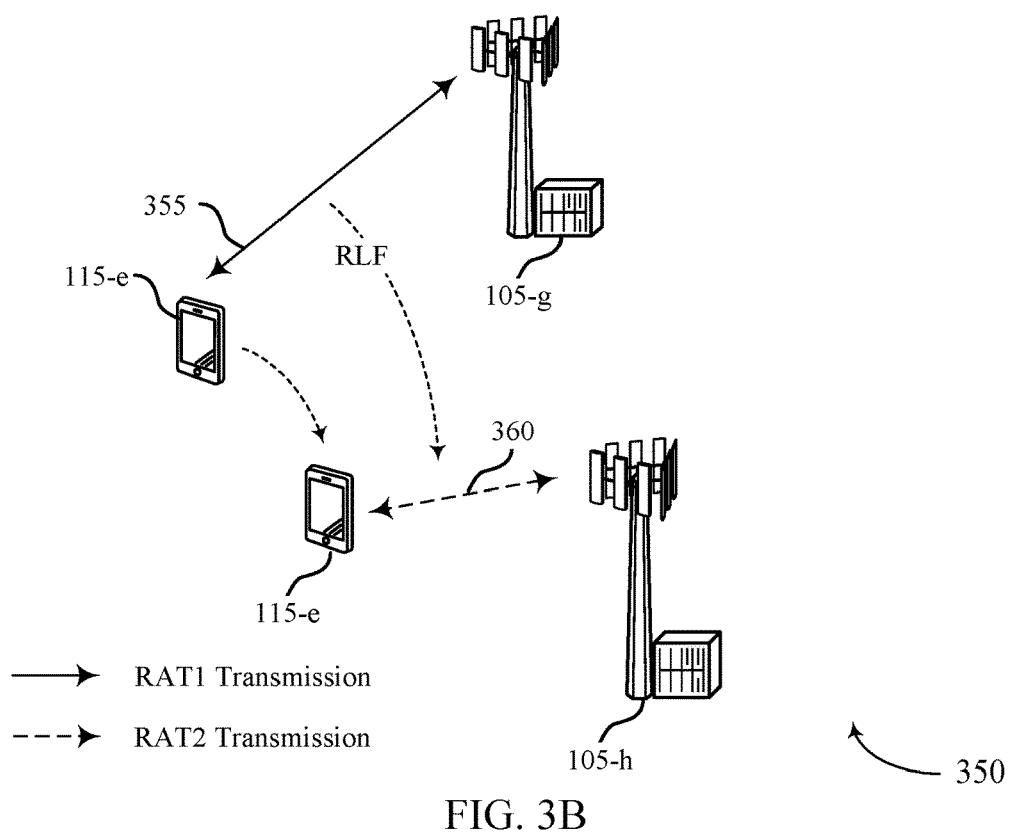
FIG. 3B illustrates an example of a new connection establishment using a different RAT in accordance with aspects of the present disclosure.

FIG. 3B illustrates an example 350 of a new connection establishment using a different RAT, in accordance with aspects of the present disclosure. In the example of FIG. 3B, a UE 115-e, which may be an example of a UE 115 of FIGS. 1-3A, may establish a first connection 335 using a first RAT with a first base station 105-g, which may be an example of a base station 105 of FIGS. 1-3A. Similarly as above, the UE 115-e may experience RLF on the first connection 355, start a drop call timer and a connection re-establishment timer, and attempt to re-establish a connection using the first RAT in a manner such as discussed with respect to FIG. 3A.

In the example of FIG. 3B, the UE 115-e may not identify a cell serving the first RAT during the duration of $T_d$ and may have discovered that the second base station 105-h is available using a second RAT. In such cases, as discussed above, even though the second base station 105-h is identified as being available, the UE 115-e will not seek to establish a connection with the second base station 105-h, and instead the UE 115-e may cache the found neighbor and continue to attempt to acquire the service on the first RAT until the expiration of $T_d$. In the example of FIG. 3B, another cell using the first RAT is not found before $T_d$ expires, and the UE 115-e may attempt to establish connection 360 with the second base station 105-g using the second RAT, and drop the voice call. While the above examples of FIGS. 2-3 illustrate a call that is established using a 4G LTE RAT or a 5G NR RAT, such techniques may also be used for other RATs or combinations of RATs.

Figure 4:
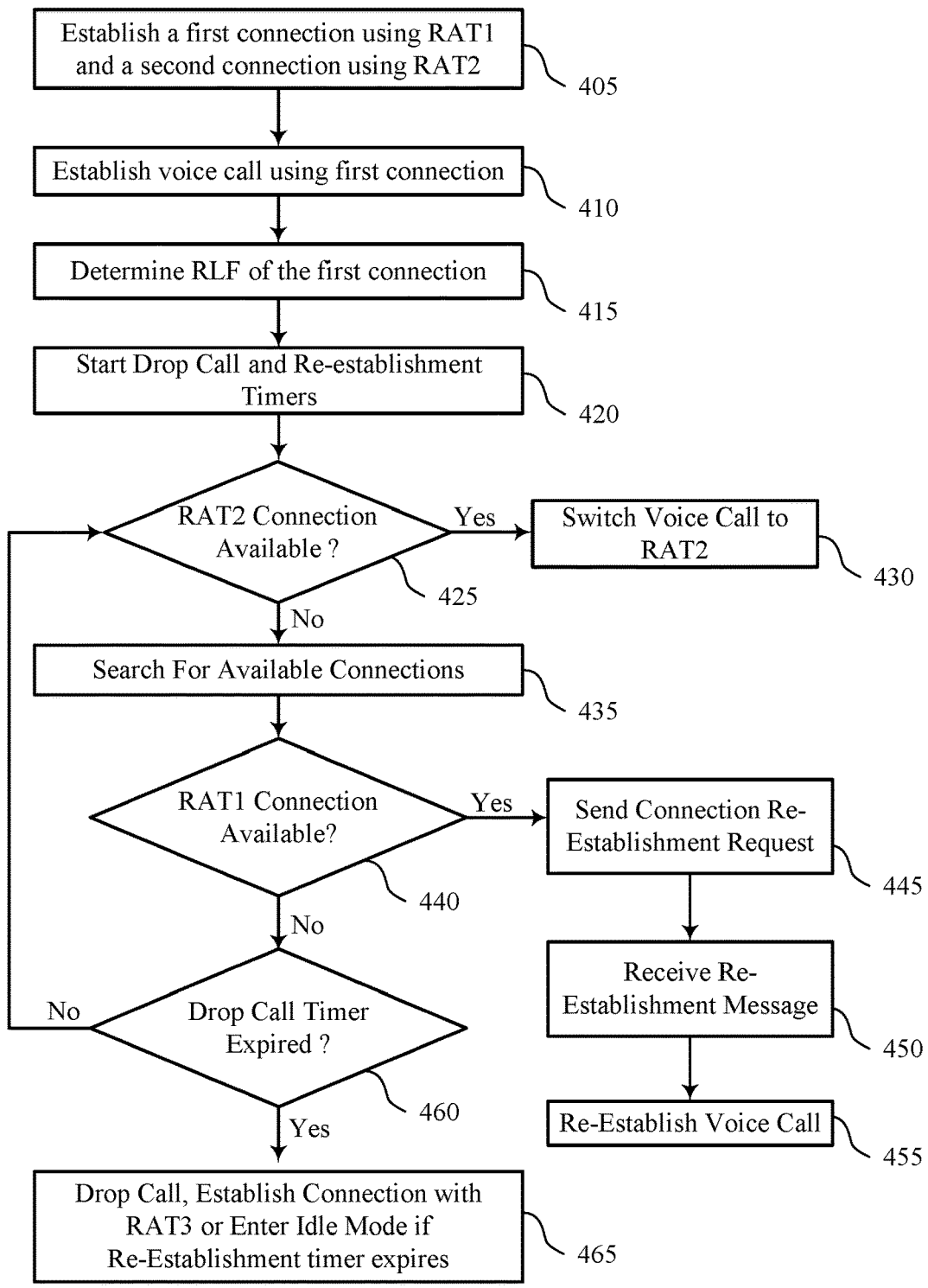
FIG. 4 illustrates an example of a non-stand-alone (NSA) mode process flow that supports voice call management techniques in wireless communications in accordance with aspects of the present disclosure.

FIG. 4 illustrates an example of a process flow 400 that supports voice call management techniques in wireless communications in accordance with various aspects of the present disclosure. In some examples, process flow 400 may be used to implement aspects of wireless communication system 100. The process flow may be performed by a UE, such as a UE 115 of FIGS. 1 through 3.

In the example of FIG. 4, at 405 the UE may operate in NSA mode and may establish a first connection using a first RAT, and a concurrent second connection using a second RAT. The connections may be established according to known connection establishment techniques associated with the first RAT and the second RAT. In some cases, the first RAT may be a NR RAT, and the first connection may be established in accordance with a NR connection establishment procedure. In some cases, the second RAT may be an LTE RAT, and the second connection may be established in accordance with LTE connection establishment procedures.

The UE, at 410, may establish a voice call using the first connection. In some cases, the voice call may be established using voice over NR (VO NR) techniques, and the voice call may have an associated IP address and VDN information.

At 415, the UE may determine that RLF has occurred on the first connection. In some cases, the RLF may occur due to fast fading before a handover can occur. The UE may identify the RLF, for example, based on a lack of signals of the first connection, signals dropping below a signal quality threshold, or a large number of decoding errors. The UE, in some cases, may declare RLF and attempt to maintain call continuity for the voice call.

The UE, at 420, may start a drop call timer and a connection re-establishment timer. In some cases, the drop call timer may be configured to a duration that is shorter than the connection re-establishment timer. In some cases, the drop call timer may be set to a duration at which a user is likely to manually drop the voice call. The connection re-establishment timer may have a duration following which the UE is to move to an idle state and periodically scan for available signals.

At 425, the UE may determine if the second connection using the second RAT is still available. Such a determination may be made, in some cases, by measuring a quality metric associated with the second connection. In other cases, the determination may be made based on whether the UE is continuing to receive and successfully decode transmissions over the second connection.

If the second connection is still available the UE may, at 430, switch the voice call to the second RAT. In some cases, the UE may initiate a voice call via the second RAT using the IP address and VDN information of the voice call, so that voice call gets transferred and re-established with a SIP invite on the second RAT. In such cases, the voice call may be maintained, and the UE may have IMS call continuity.

If the second connection is not available the UE may, at 430, search for other available connections, including connections of a different RAT than the first RAT or the second RAT. In some cases, the UE may perform a channel scan to identify potential available RATs for connection.

At 440, the UE may determine whether a connection using the first RAT is available. In some cases, a different cell that operates using the first RAT may have sufficient signal strength that the UE may be able to establish a connection with the different cell. For example, a first cell may be located on one side of a tunnel or geographic feature that blocks the signal of the first connection, and a second cell that uses the first RAT may be located on the other side of the tunnel or geographic feature. Thus, as the UE passes the tunnel or other geographic feature, the second cell may be identified as being available.

If another connection of the first RAT is available, the UE, at 445, may send a connection re-establishment request to a second cell that serves the first RAT. In some cases, the connection re-establishment request may be an RRC connection re-establishment request to re-establish the initial connection according to the context of the initial connection.

At 450, the UE may receive a connection re-establishment message. The connection re-establishment message may be received from the second cell that is located following the RLF on the first cell and may indicate that the UE can continue the first connection. The UE may, at 455, re-establish the voice call using the first RAT.

In the event that the UE is not able to find any available connections to the first RAT, the UE may, at 460, determine if the drop call timer has expired. In the drop call timer has not expired, the UE may perform the operations starting at 425 again.

If the drop call timer has expired, the UE at 465 may establish a connection with a third RAT if such a third RAT was identified when the UE scanned for available connections. The UE, in such cases, may drop the voice call. A user may attempt to re-dial the voice call, in which case the UE may attempt to establish a new voice call using the third RAT. In cases where a third RAT was not identified when the UE was scanning for available connections, the UE may continue to scan for available connections until the expiration of the re-establishment timer. If the re-establishment timer expires before any available connection is identified, the UE may enter an idle mode and periodically scan for available connections in accordance with idle mode procedures.

Figure 5:
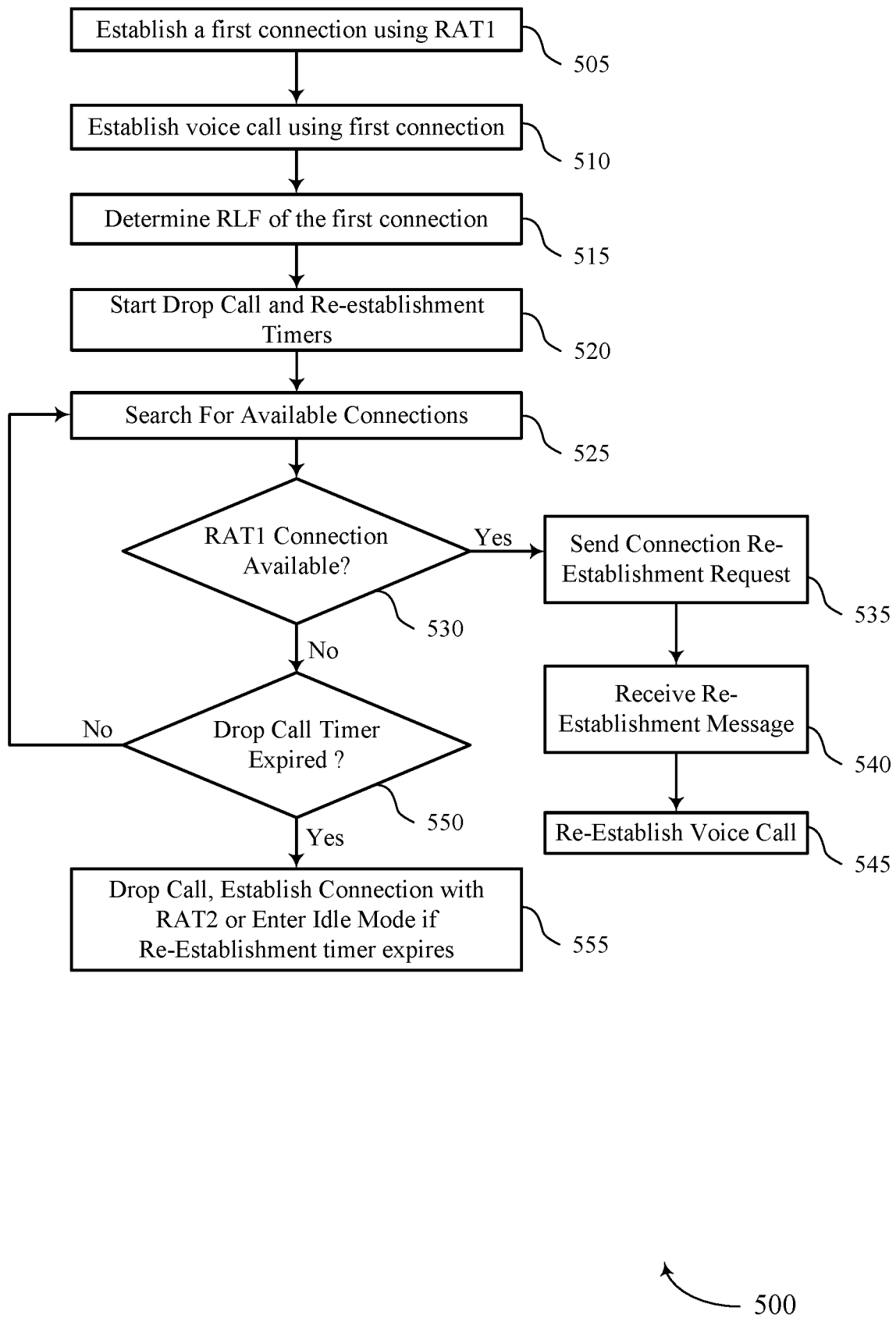
FIG. 5 illustrates an example of a stand-alone (SA) mode process flow that supports voice call management techniques in wireless communications in accordance with aspects of the present disclosure.

FIG. 5 illustrates an example of a process flow 500 that supports voice call management techniques in wireless communications in accordance with various aspects of the present disclosure. In some examples, process flow 500 may be used to implement aspects of wireless communication system 100. The process flow may be performed by a UE, such as a UE 115 of FIGS. 1 through 3.

In the example of FIG. 5, at 505 the UE may operate in SA mode and may establish a first connection using a first RAT. The connection may be established according to known connection establishment techniques associated with the first RAT. In some cases, the first RAT may be a NR RAT, and the first connection may be established in accordance with a NR connection establishment procedure. In some cases, the first RAT may be an LTE RAT, or a 2G or 3G RAT, and the second connection may be established in accordance with the corresponding connection establishment procedures.

The UE, at 510, may establish a voice call using the first connection. In cases where the first connection uses a NR RAT, the voice call may be established using VO NR techniques, and the voice call may have an associated IP address and VDN information. In cases where the first connection uses an LTE RAT, the voice call may be established using VO LTE techniques, and the voice call may have an associated IP address and VDN information. In cases where a 2G or 3G RAT supports the first connection, the voice call may be a circuit switched (CS) call.

At 515, the UE may determine that RLF has occurred on the first connection. In some cases, the RLF may occur due to fast fading before a handover can occur. The UE may identify the RLF, for example, based on a lack of signals of the first connection, signals dropping below a signal quality threshold, or a large number of decoding errors. The UE, in some cases, may declare RLF and attempt to maintain call continuity for the voice call.

The UE, at 520, may start a drop call timer and a connection re-establishment timer. In some cases, the drop call timer may be configured to a duration that is shorter than the connection re-establishment timer. In some cases, the drop call timer may be set to a duration at which a user is likely to manually drop the voice call. The connection re-establishment timer may have a duration following which the UE is to move to an idle state and periodically scan for available signals.

At 525, the UE may search for other available connections, including connections of a different RAT than the first RAT. In some cases, the UE may perform a channel scan to identify potential available RATs for connection.

At 530, the UE may determine whether a connection using the first RAT is available. In some cases, a different cell that operates using the first RAT may have sufficient signal strength that the UE may be able to establish a connection with the different cell. As discussed above, for example, a first cell may be located on one side of a tunnel or geographic feature that blocks the signal of the first connection, and a second cell that uses the first RAT may be located on the other side of the tunnel or geographic feature.

If another connection of the first RAT is available the UE, at 535, may send a connection re-establishment request to a second cell that serves the first RAT. In some cases, the connection re-establishment request may be an RRC connection re-establishment request to re-establish the initial connection according to the context of the initial connection.

At 540, the UE may receive a connection re-establishment message. The connection re-establishment message may be received from the second cell that is located following the RLF on the first cell and may indicate that the UE can continue the first connection. The UE may, at 545, re-establish the voice call using the first RAT.

In the event that the UE is not able to find any available connections to the first RAT, the UE may, at 550, determine if the drop call timer has expired. In the drop call timer has not expired, the UE may perform the operations starting at 525 again.

If the drop call timer has expired, the UE at 555 may establish a connection with a second RAT if such a second RAT was identified when the UE scanned for available connections. The UE, in such cases, may drop the voice call. A user may attempt to re-dial the voice call, in which case the UE may attempt to establish a new voice call using the second RAT. In cases where a second RAT was not identified when the UE was scanning for available connections, the UE may continue to scan for available connections until the expiration of the re-establishment timer. If the re-establishment timer expires before any available connection is identified, the UE may enter an idle mode and periodically scan for available connections in accordance with idle mode procedures.

Figure 6:
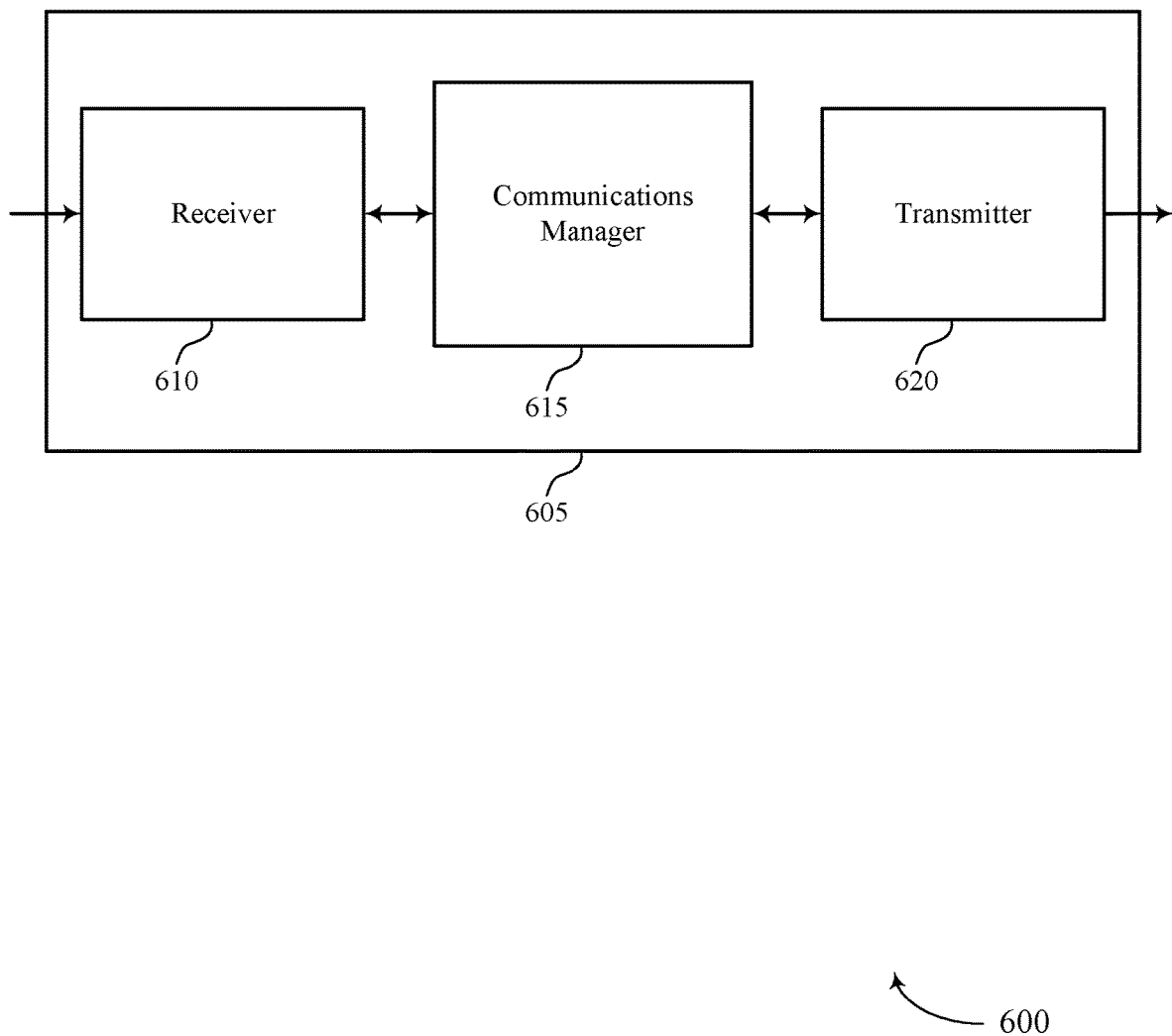
FIGS. 6 through 8 illustrate block diagrams of a device that support voice call management techniques in wireless communications in accordance with aspects of the present disclosure.

FIG. 6 shows a block diagram 600 of a wireless device 605 that supports voice call management techniques in wireless communications in accordance with aspects of the present disclosure. Wireless device 605 may be an example of aspects of a user equipment (UE) 115 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to voice call management techniques in wireless communications, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, communications manager 615 may establish a first connection with a first RAN using a RAT and a concurrent second connection with a second RAN using a second RAT, establish a voice call using the first connection, determine that a RLF has occurred for the first connection, initiate a drop call timer and a connection re-establishment timer responsive to the determining that the RLF has occurred for the first connection, determine, during a duration of the drop call timer, whether the second connection remains available for wireless communications, and switch the voice call to the second connection responsive to determining that the second connection remains available for wireless communications.

In other cases, communications manager 615 may establish a first connection with a first RAN using a first RAT, establish a voice call using the first connection, determine that a RLF has occurred for the first connection, initiate a drop call timer responsive to the determining that the RLF has occurred for the first connection, identify that a second RAN using a second RAT is available for a wireless connection responsive to determining the RLF, attempt to re-establish the first connection with the first RAN during a duration of the drop call timer, and attempt to establish a second connection with the second RAN responsive to an expiration of the drop call timer.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
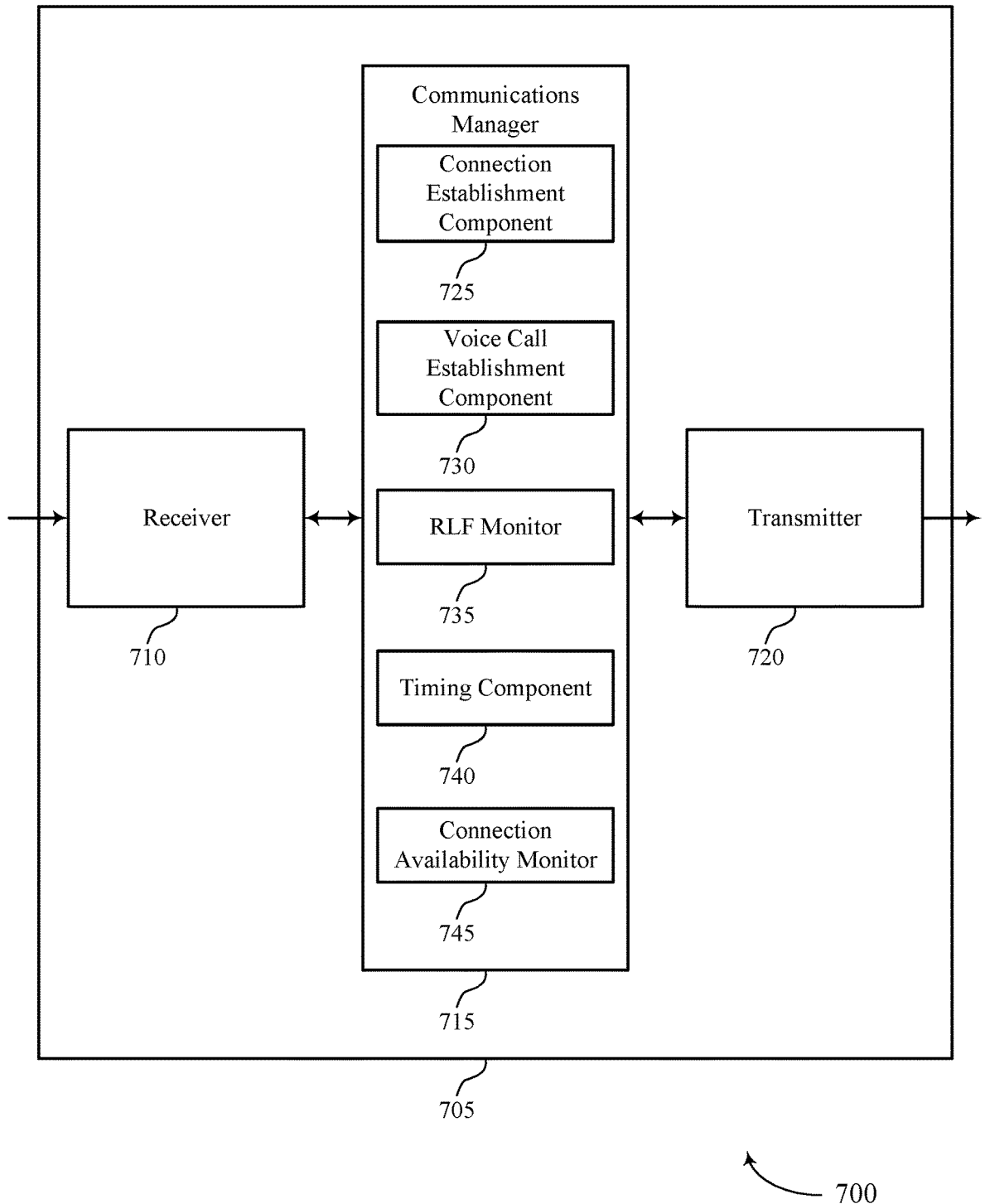

FIG. 7 shows a block diagram 700 of a wireless device 705 that supports voice call management techniques in wireless communications in accordance with aspects of the present disclosure. Wireless device 705 may be an example of aspects of a wireless device 605 or a UE 115 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to voice call management techniques in wireless communications, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include connection establishment component 725, voice call establishment component 730, RLF monitor 735, timing component 740, and connection availability monitor 745.

Connection establishment component 725 when operating in NSA mode, may establish a first connection with a first RAN using a first RAT and a concurrent second connection with a second RAN using a second RAT. In cases where a SA mode is used, connection establishment component 725 may establish only a first connection with a first RAN using a first RAT. In some cases, the first RAT is a 5G or NR RAT and the second RAT is a 4G or LTE RAT. In some cases, the first RAT is a 4G or LTE RAT and the second RAT is a 5G or NR RAT. In some cases, following RLF at the first RAT, connection establishment component 725 may transmit a connection re-establishment request to the first RAN responsive to the identifying that the first RAN is available during the duration of a drop call timer, and re-establish the first connection responsive to the re-establishment request.

In some cases, following RLF and the expiration of a drop call timer, connection establishment component 725 may establish a third connection with the third RAN using the third RAT responsive to an expiration of the drop call timer, or switch to an idle mode responsive to an expiration of a connection re-establishment timer before re-establishment of the first connection or establishment of the third connection.

Voice call establishment component 730 may establish a voice call using the first connection, switch the voice call to the second connection responsive to determining that the second connection remains available for wireless communications when in NSA mode. In some cases, voice call establishment component 730 may re-establish the voice call using a re-established first connection.

RLF monitor 735 may determine that an RLF has occurred for the first connection. Timing component 740 may initiate a drop call timer and a connection re-establishment timer responsive to the determining that the RLF has occurred for the first connection. In some cases, the drop call timer has a first duration that is shorter than a second duration of the connection re-establishment timer, and the first duration is based on a time a user will wait before dropping the voice call.

Connection availability monitor 745 may determine, during a duration of the drop call timer, whether the second connection remains available for wireless communications, when operating in NSA mode. In some cases, connection availability monitor 745 may identify that a third RAN using a third RAT is available for a wireless connection responsive to determining that the second connection is unavailable for wireless communications. In some cases, connection availability monitor 745 may identify that a connection the first RAN is available during the duration of the drop call timer. In some cases that use a SA mode, connection availability monitor 745 may identify that a second RAN using a second RAT is available for a wireless connection responsive to determining the RLF at the first RAT.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
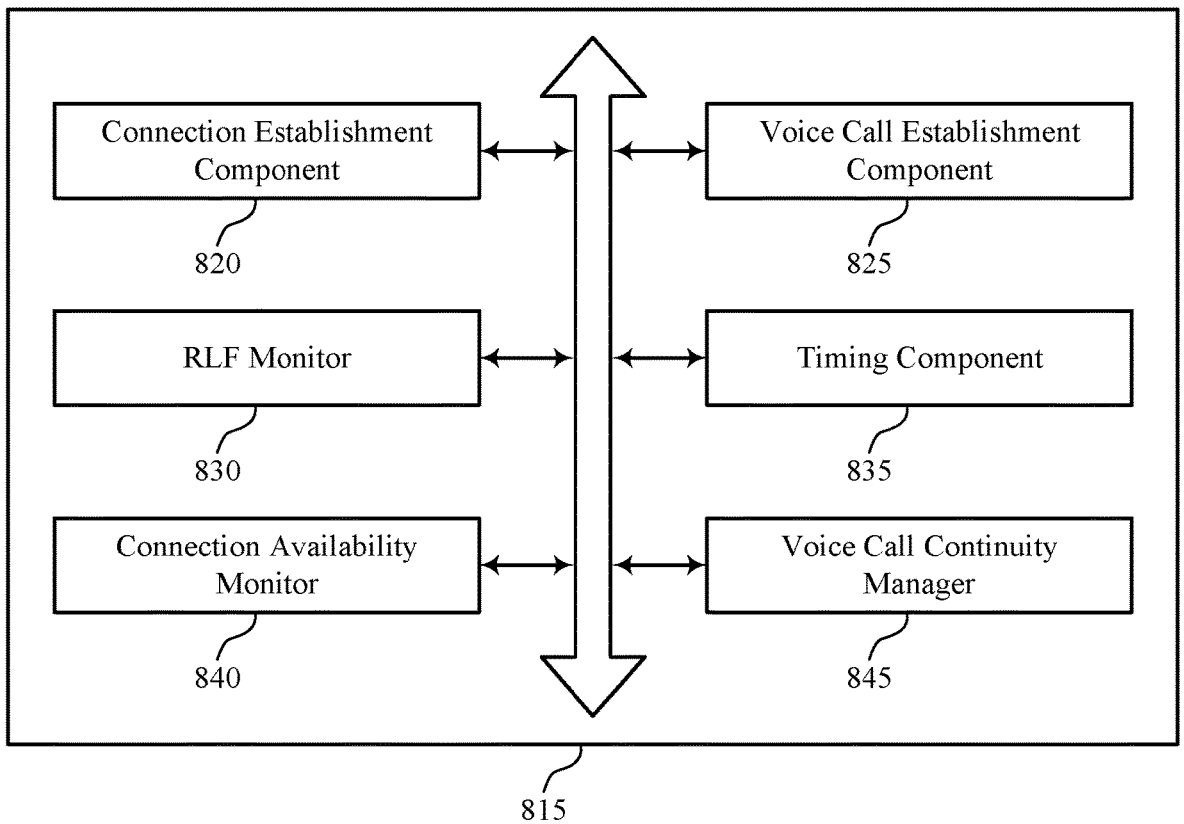

FIG. 8 shows a block diagram 800 of a communications manager 815 that supports voice call management techniques in wireless communications in accordance with aspects of the present disclosure. The communications manager 815 may be an example of aspects of a communications manager 615, a communications manager 715, or a communications manager 915 described with reference to FIGS. 6, 7, and 9. The communications manager 815 may include connection establishment component 820, voice call establishment component 825, RLF monitor 830, timing component 835, connection availability monitor 840, and voice call continuity manager 845. Each of these modules may communicate, directly or indirectly, with one another (e.g., via one or more buses).

Connection establishment component 820 when operating in NSA mode, may establish a first connection with a first RAN using a first RAT and a concurrent second connection with a second RAN using a second RAT. In cases where a SA mode is used, connection establishment component 820 may establish only a first connection with a first RAN using a first RAT. In some cases, the first RAT is a 5G or NR RAT and the second RAT is a 4G or LTE RAT. In some cases, the first RAT is a 4G or LTE RAT and the second RAT is a 5G or NR RAT. In some cases, following RLF at the first RAT, connection establishment component 820 may transmit a connection re-establishment request to the first RAN responsive to the identifying that the first RAN is available during the duration of a drop call timer, and re-establish the first connection responsive to the re-establishment request.

In some cases, following RLF and the expiration of a drop call timer, connection establishment component 820 may establish a third connection with the third RAN using the third RAT responsive to an expiration of the drop call timer, or switch to an idle mode responsive to an expiration of a connection re-establishment timer before re-establishment of the first connection or establishment of the third connection.

Voice call establishment component 825 may establish a voice call using the first connection, switch the voice call to the second connection responsive to determining that the second connection remains available for wireless communications when in NSA mode. In some cases, voice call establishment component 825 may re-establish the voice call using a re-established first connection.

RLF monitor 830 may determine that a RLF has occurred for the first connection. Timing component 835 may initiate a drop call timer and a connection re-establishment timer responsive to the determining that the RLF has occurred for the first connection. In some cases, the drop call timer has a first duration that is shorter than a second duration of the connection re-establishment timer, and the first duration is based on a time a user will wait before dropping the voice call.

Connection availability monitor 840 may determine, during a duration of the drop call timer, whether the second connection remains available for wireless communications, when operating in NSA mode. In some cases, connection availability monitor 840 may identify that a third RAN using a third RAT is available for a wireless connection responsive to determining that the second connection is unavailable for wireless communications. In some cases, connection availability monitor 840 may identify that a connection the first RAN is available during the duration of the drop call timer. In some cases that use a SA mode, connection availability monitor 840 may identify that a second RAN using a second RAT is available for a wireless connection responsive to determining the RLF at the first RAT.

Voice call continuity manager 845 may identify that a cell identification (cell ID) of a cell that serves the first connection is included in a list of cell IDs that are more likely to have RLF. In some cases, voice call continuity manager 845 may transmit a session initiation protocol (SIP) invite for the voice call to a second RAN via the second connection, and re-establish the voice call on the second connection.

Figure 9:
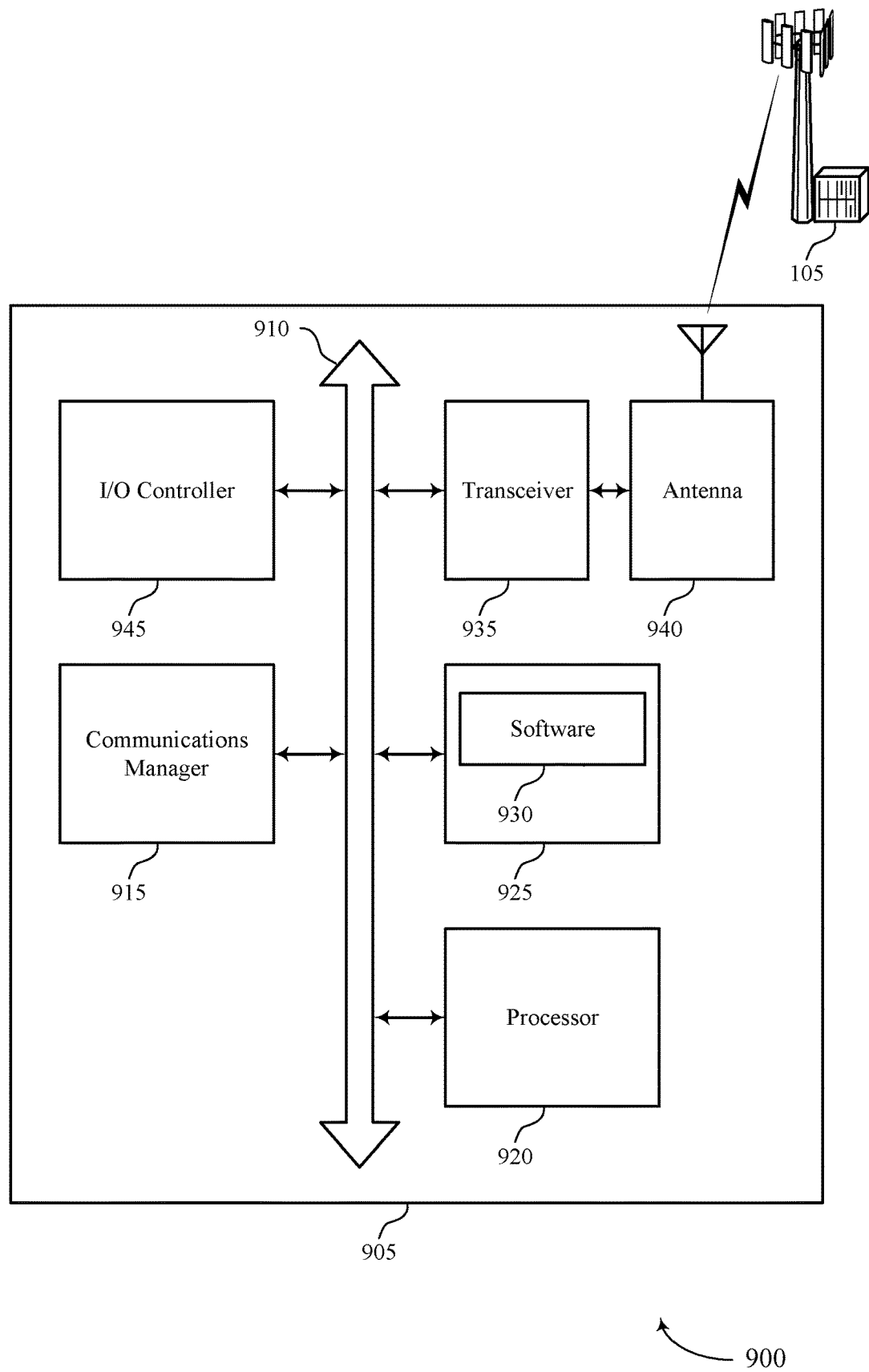
FIG. 9 illustrates a block diagram of a system including a user equipment (UE) that supports voice call management techniques in wireless communications in accordance with aspects of the present disclosure.

FIG. 9 shows a diagram of a system 900 including a device 905 that supports voice call management techniques in wireless communications in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting voice call management techniques in wireless communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support voice call management techniques in wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
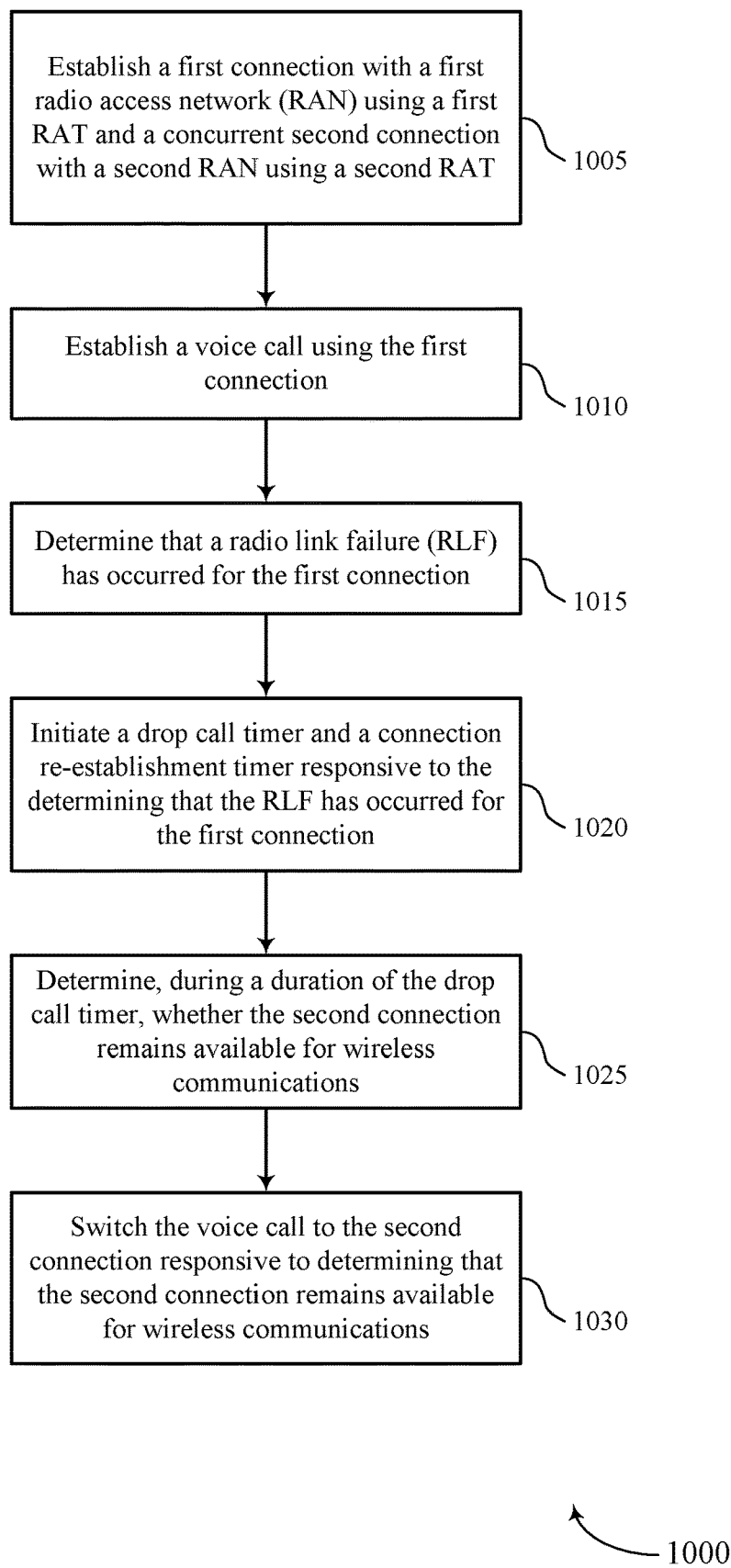
FIGS. 10 through 14 illustrate methods for voice call management techniques in wireless communications in accordance with aspects of the present disclosure.

FIG. 10 shows a flowchart illustrating a method 1000 for voice call management techniques in wireless communications in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1005 the UE 115 may establish a first connection with a first RAN using a first RAT and a concurrent second connection with a second RAN using a second RAT. The operations of 1005 may be performed according to the methods described herein. In certain examples, aspects of the operations of 1005 may be performed by a connection establishment component as described with reference to FIGS. 6 through 9.

At 1010 the UE 115 may establish a voice call using the first connection. The operations of 1010 may be performed according to the methods described herein. In certain examples, aspects of the operations of 1010 may be performed by a voice call establishment component as described with reference to FIGS. 6 through 9.

At 1015 the UE 115 may determine that an RLF has occurred for the first connection. The operations of 1015 may be performed according to the methods described herein. In certain examples, aspects of the operations of 1015 may be performed by an RLF monitor as described with reference to FIGS. 6 through 9.

At 1020 the UE 115 may initiate a drop call timer and a connection re-establishment timer responsive to the determining that the RLF has occurred for the first connection. The operations of 1020 may be performed according to the methods described herein. In certain examples, aspects of the operations of 1020 may be performed by a timing component as described with reference to FIGS. 6 through 9.

At 1025 the UE 115 may determine, during a duration of the drop call timer, whether the second connection remains available for wireless communications. The operations of 1025 may be performed according to the methods described herein. In certain examples, aspects of the operations of 1025 may be performed by a connection availability monitor as described with reference to FIGS. 6 through 9.

At 1030 the UE 115 may switch the voice call to the second connection responsive to determining that the second connection remains available for wireless communications. The operations of 1030 may be performed according to the methods described herein. In certain examples, aspects of the operations of 1030 may be performed by a voice call establishment component as described with reference to FIGS. 6 through 9.

Figure 11:
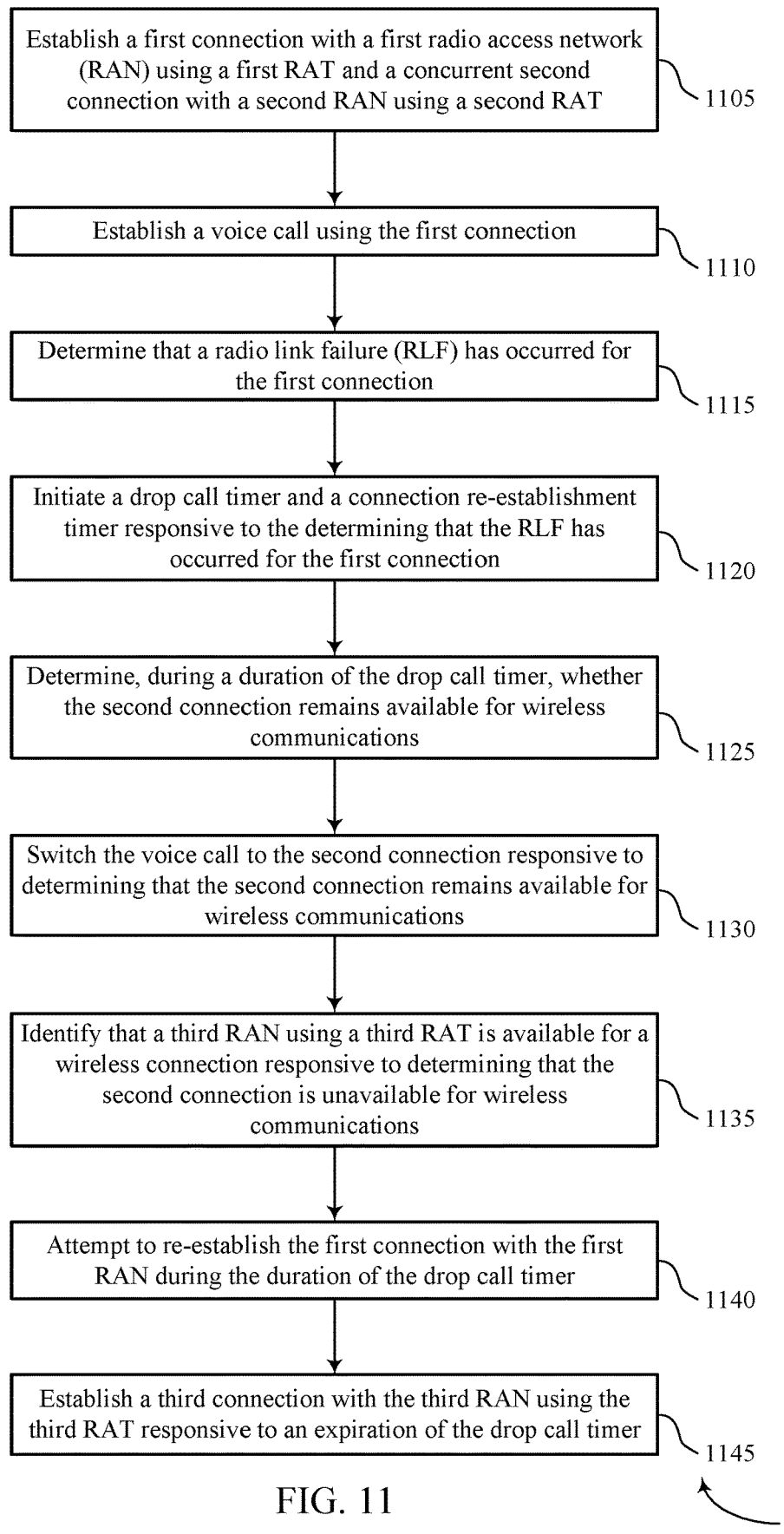

FIG. 11 shows a flowchart illustrating a method 1100 for voice call management techniques in wireless communications in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1105 the UE 115 may establish a first connection with a first RAN using a first RAT and a concurrent second connection with a second RAN using a second RAT. The operations of 1105 may be performed according to the methods described herein. In certain examples, aspects of the operations of 1105 may be performed by a connection establishment component as described with reference to FIGS. 6 through 9.

At 1110 the UE 115 may establish a voice call using the first connection. The operations of 1110 may be performed according to the methods described herein. In certain examples, aspects of the operations of 1110 may be performed by a voice call establishment component as described with reference to FIGS. 6 through 9.

At 1115 the UE 115 may determine that an RLF has occurred for the first connection. The operations of 1115 may be performed according to the methods described herein. In certain examples, aspects of the operations of 1115 may be performed by an RLF monitor as described with reference to FIGS. 6 through 9.

At 1120 the UE 115 may initiate a drop call timer and a connection re-establishment timer responsive to the determining that the RLF has occurred for the first connection. The operations of 1120 may be performed according to the methods described herein. In certain examples, aspects of the operations of 1120 may be performed by a timing component as described with reference to FIGS. 6 through 9.

At 1125 the UE 115 may determine, during a duration of the drop call timer, whether the second connection remains available for wireless communications. The operations of 1125 may be performed according to the methods described herein. In certain examples, aspects of the operations of 1125 may be performed by a connection availability monitor as described with reference to FIGS. 6 through 9.

At 1130 the UE 115 may switch the voice call to the second connection responsive to determining that the second connection remains available for wireless communications. The operations of 1130 may be performed according to the methods described herein. In certain examples, aspects of the operations of 1130 may be performed by a voice call establishment component as described with reference to FIGS. 6 through 9.

At 1135 the UE 115 may identify that a third RAN using a third RAT is available for a wireless connection responsive to determining that the second connection is unavailable for wireless communications. The operations of 1135 may be performed according to the methods described herein. In certain examples, aspects of the operations of 1135 may be performed by a connection availability monitor as described with reference to FIGS. 6 through 9.

At 1140 the UE 115 may attempt to re-establish the first connection with the first RAN during the duration of the drop call timer. The operations of 1140 may be performed according to the methods described herein. In certain examples, aspects of the operations of 1140 may be performed by a connection establishment component as described with reference to FIGS. 6 through 9.

At 1145 the UE 115 may establish a third connection with the third RAN using the third RAT responsive to an expiration of the drop call timer. The operations of 1145 may be performed according to the methods described herein. In certain examples, aspects of the operations of 1145 may be performed by a connection establishment component as described with reference to FIGS. 6 through 9.

Figure 12:
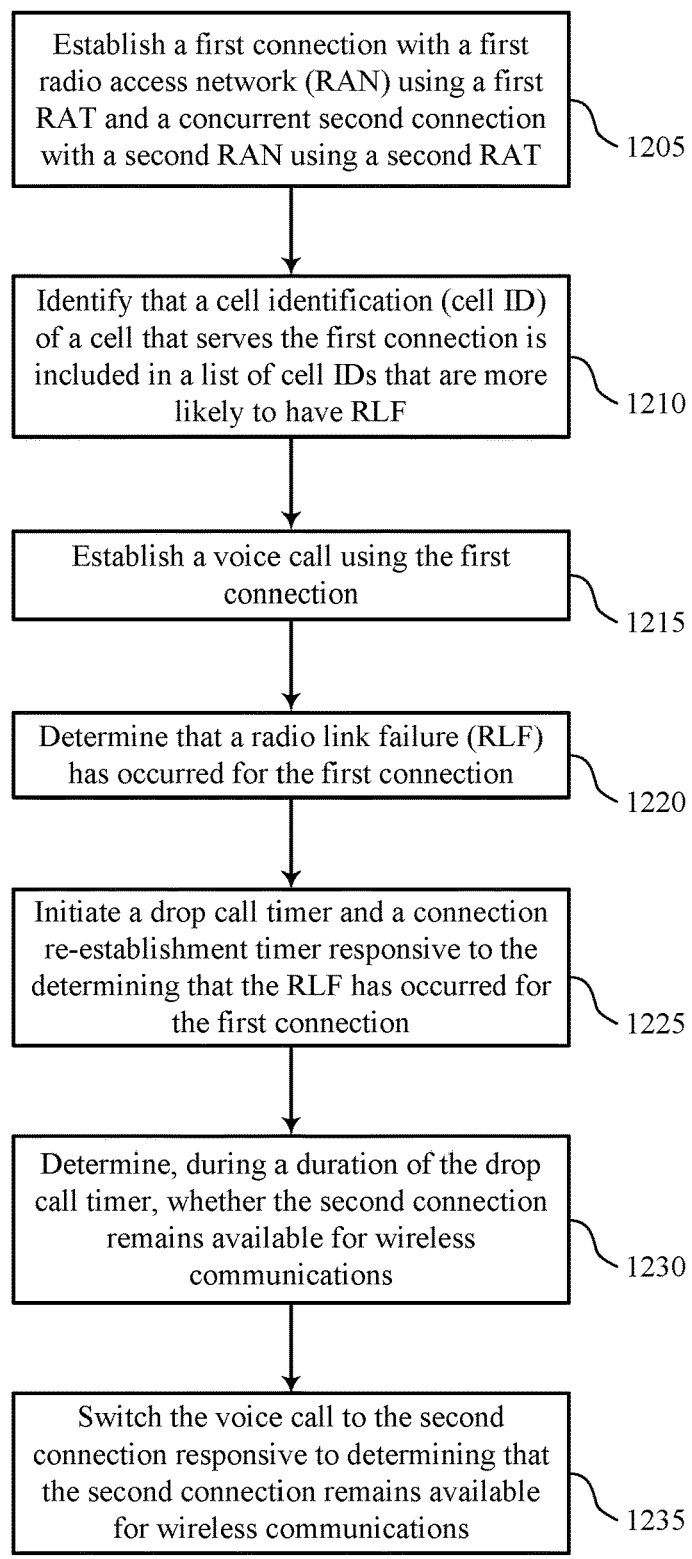

FIG. 12 shows a flowchart illustrating a method 1200 for voice call management techniques in wireless communications in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1205 the UE 115 may establish a first connection with a first RAN using a first RAT and a concurrent second connection with a second RAN using a second RAT. The operations of 1205 may be performed according to the methods described herein. In certain examples, aspects of the operations of 1205 may be performed by a connection establishment component as described with reference to FIGS. 6 through 9.

At 1210 the UE 115 may identify that a cell identification (cell ID) of a cell that serves the first connection is included in a list of cell IDs that are more likely to have RLF. The operations of 1210 may be performed according to the methods described herein. In certain examples, aspects of the operations of 1210 may be performed by a voice call continuity manager as described with reference to FIGS. 6 through 9.

At 1215 the UE 115 may establish a voice call using the first connection. The operations of 1215 may be performed according to the methods described herein. In certain examples, aspects of the operations of 1215 may be performed by a voice call establishment component as described with reference to FIGS. 6 through 9.

At 1220 the UE 115 may determine that an RLF has occurred for the first connection. The operations of 1220 may be performed according to the methods described herein. In certain examples, aspects of the operations of 1220 may be performed by an RLF monitor as described with reference to FIGS. 6 through 9.

At 1225 the UE 115 may initiate a drop call timer and a connection re-establishment timer responsive to the determining that the RLF has occurred for the first connection. In some cases, the initiation of the drop call timer may be performed responsive to the identifying the cell ID is included in the list of cell IDs. The operations of 1225 may be performed according to the methods described herein. In certain examples, aspects of the operations of 1225 may be performed by a timing component as described with reference to FIGS. 6 through 9.

At 1230 the UE 115 may determine, during a duration of the drop call timer, whether the second connection remains available for wireless communications. The operations of 1230 may be performed according to the methods described herein. In certain examples, aspects of the operations of 1230 may be performed by a connection availability monitor as described with reference to FIGS. 6 through 9.

At 1235 the UE 115 may switch the voice call to the second connection responsive to determining that the second connection remains available for wireless communications. The operations of 1235 may be performed according to the methods described herein. In certain examples, aspects of the operations of 1235 may be performed by a voice call establishment component as described with reference to FIGS. 6 through 9.

Figure 13:
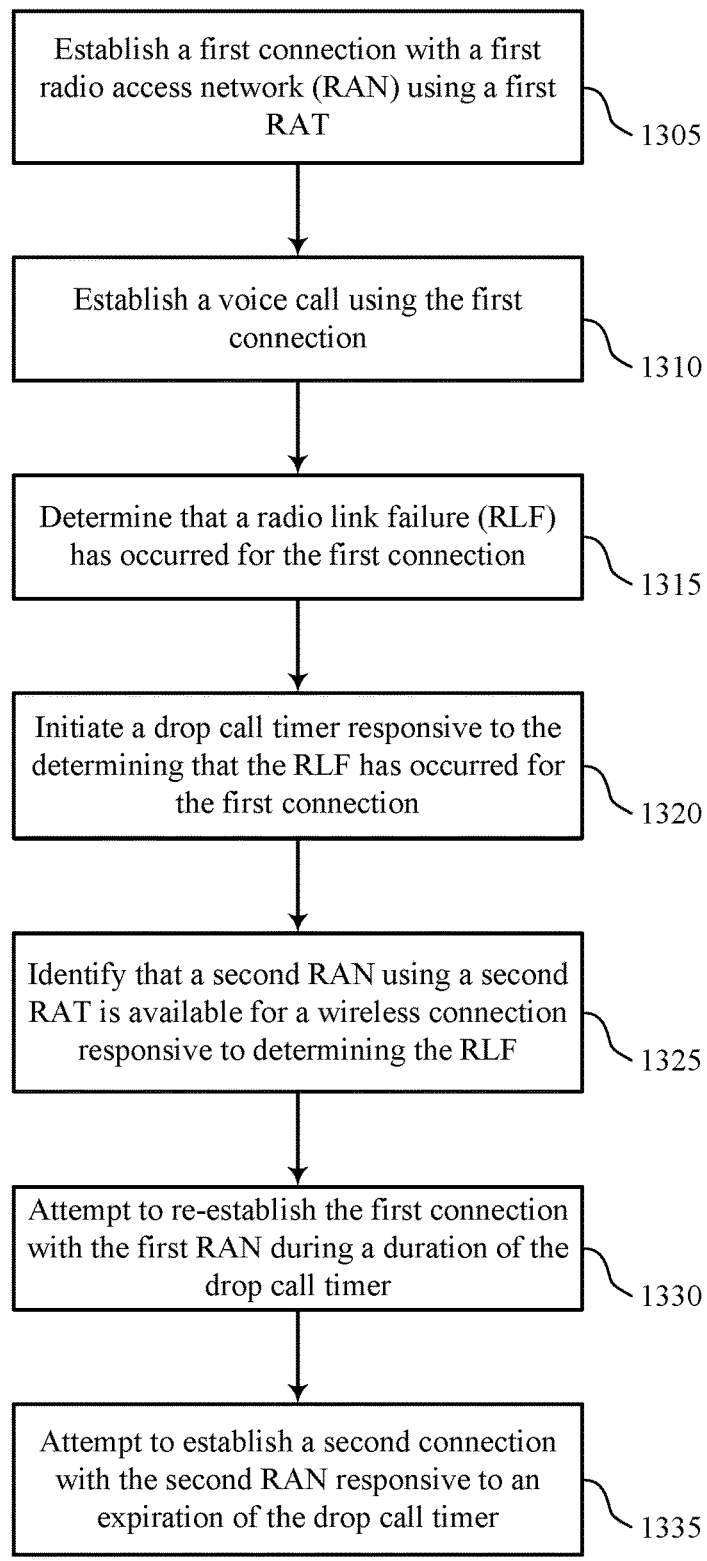

FIG. 13 shows a flowchart illustrating a method 1300 for voice call management techniques in wireless communications in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may establish a first connection with a first RAN using a first RAT. The operations of 1305 may be performed according to the methods described herein. In certain examples, aspects of the operations of 1305 may be performed by a connection establishment component as described with reference to FIGS. 6 through 9.

At 1310 the UE 115 may establish a voice call using the first connection. The operations of 1310 may be performed according to the methods described herein. In certain examples, aspects of the operations of 1310 may be performed by a voice call establishment component as described with reference to FIGS. 6 through 9.

At 1315 the UE 115 may determine that an RLF has occurred for the first connection. The operations of 1315 may be performed according to the methods described herein. In certain examples, aspects of the operations of 1315 may be performed by an RLF monitor as described with reference to FIGS. 6 through 9.

At 1320 the UE 115 may initiate a drop call timer responsive to the determining that the RLF has occurred for the first connection. The operations of 1320 may be performed according to the methods described herein. In certain examples, aspects of the operations of 1320 may be performed by a timing component as described with reference to FIGS. 6 through 9.

At 1325 the UE 115 may identify that a second RAN using a second RAT is available for a wireless connection responsive to determining the RLF. The operations of 1325 may be performed according to the methods described herein. In certain examples, aspects of the operations of 1325 may be performed by a connection availability monitor as described with reference to FIGS. 6 through 9.

At 1330 the UE 115 may attempt to re-establish the first connection with the first RAN during a duration of the drop call timer. The operations of 1330 may be performed according to the methods described herein. In certain examples, aspects of the operations of 1330 may be performed by a connection establishment component as described with reference to FIGS. 6 through 9.

At 1335 the UE 115 may attempt to establish a second connection with the second RAN responsive to an expiration of the drop call timer. The operations of 1335 may be performed according to the methods described herein. In certain examples, aspects of the operations of 1335 may be performed by a connection establishment component as described with reference to FIGS. 6 through 9.

Figure 14:
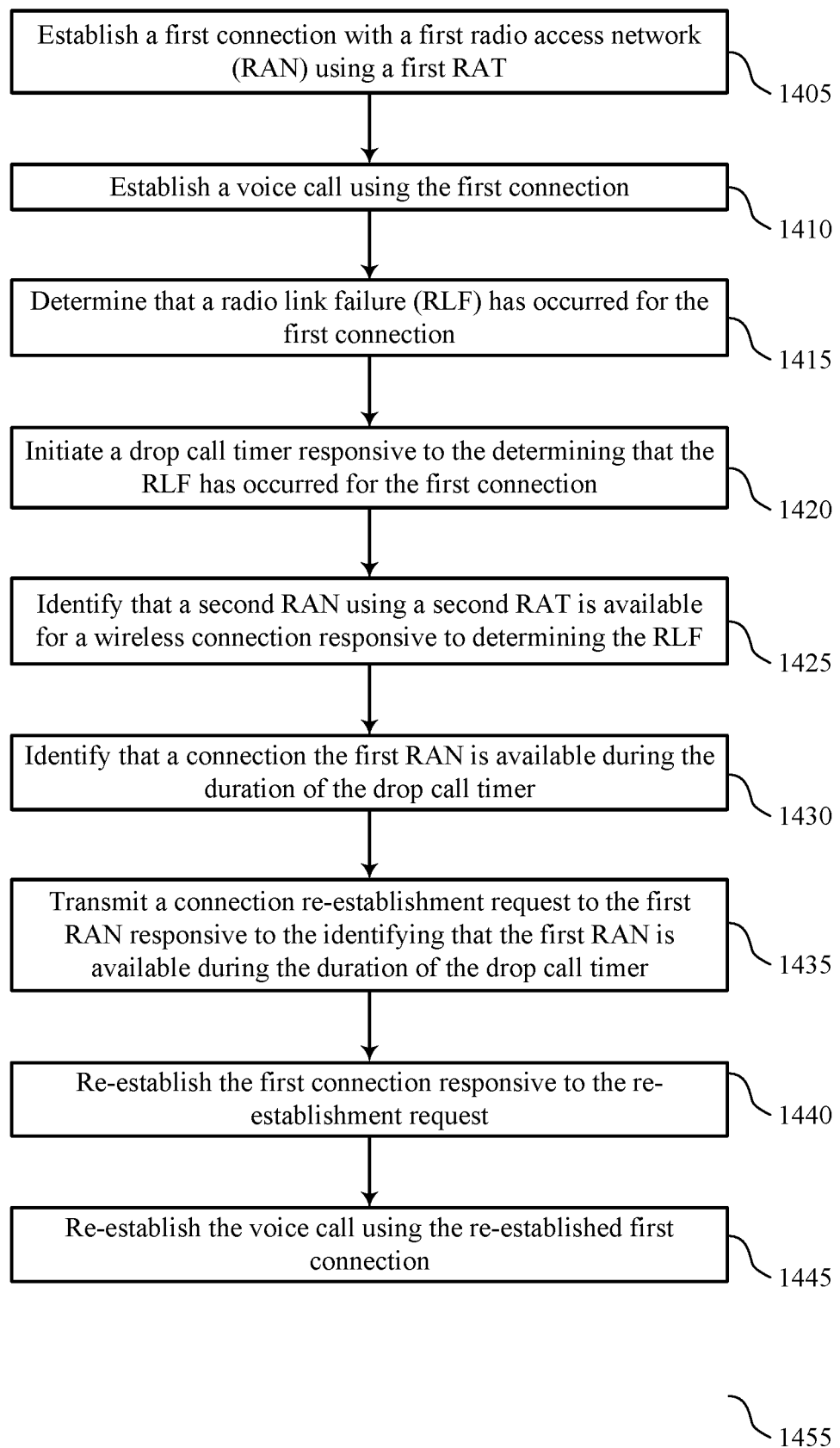

FIG. 14 shows a flowchart illustrating a method 1400 for voice call management techniques in wireless communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may establish a first connection with a first RAN using a first RAT. The operations of 1405 may be performed according to the methods described herein. In certain examples, aspects of the operations of 1405 may be performed by a connection establishment component as described with reference to FIGS. 6 through 9.

At 1410 the UE 115 may establish a voice call using the first connection. The operations of 1410 may be performed according to the methods described herein. In certain examples, aspects of the operations of 1410 may be performed by a voice call establishment component as described with reference to FIGS. 6 through 9.

At 1415 the UE 115 may determine that an RLF has occurred for the first connection. The operations of 1415 may be performed according to the methods described herein. In certain examples, aspects of the operations of 1415 may be performed by an RLF monitor as described with reference to FIGS. 6 through 9.

At 1420 the UE 115 may initiate a drop call timer responsive to the determining that the RLF has occurred for the first connection. The operations of 1420 may be performed according to the methods described herein. In certain examples, aspects of the operations of 1420 may be performed by a timing component as described with reference to FIGS. 6 through 9.

At 1425 the UE 115 may identify that a second RAN using a second RAT is available for a wireless connection responsive to determining the RLF. The operations of 1425 may be performed according to the methods described herein. In certain examples, aspects of the operations of 1425 may be performed by a connection availability monitor as described with reference to FIGS. 6 through 9.

At 1430 the UE 115 may identify that a connection the first RAN is available during the duration of the drop call timer. The operations of 1430 may be performed according to the methods described herein. In certain examples, aspects of the operations of 1430 may be performed by a connection availability monitor as described with reference to FIGS. 6 through 9.

At 1435 the UE 115 may transmit a connection re-establishment request to the first RAN responsive to the identifying that the first RAN is available during the duration of the drop call timer. The operations of 1435 may be performed according to the methods described herein. In certain examples, aspects of the operations of 1435 may be performed by a connection establishment component as described with reference to FIGS. 6 through 9.

At 1440 the UE 115 may re-establish the first connection responsive to the re-establishment request. The operations of 1440 may be performed according to the methods described herein. In certain examples, aspects of the operations of 1440 may be performed by a connection establishment component as described with reference to FIGS. 6 through 9.

At 1445 the UE 115 may re-establish the voice call using the re-established first connection. The operations of 1445 may be performed according to the methods described herein. In certain examples, aspects of the operations of 1445 may be performed by a voice call establishment component as described with reference to FIGS. 6 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a first connection with a first radio access network (RAN) using a first radio access technology (RAT) and a concurrent second connection with a second RAN using a second RAT;
    establishing a voice call using the first connection;
    caching a list of cell identifications (cell IDs) of cells that are more likely to experience RLF than one or more other cells, the list including a cell ID of a cell that serves the first connection;
    determining that a radio link failure (RLF) has occurred for the first connection;
    initiating a drop call timer and a connection re-establishment timer responsive to the determining that the RLF has occurred for the first connection;
    determining, during a duration of the drop call timer, whether the second connection remains available for wireless communications;
    caching information indicative of the second RAN during the duration of the drop call timer; and
    switching the voice call to the second connection responsive to the cell ID of the cell that serves the first connection being included in the list of cell IDs and determining that the second connection remains available for wireless communications.

2. The method of claim 1, further comprising:
    identifying that a third RAN using a third RAT is available for a wireless connection responsive to determining that the second connection is unavailable for wireless communications;
    attempting to re-establish the first connection with the first RAN during the duration of the drop call timer; and
    establishing a third connection with the third RAN using the third RAT responsive to an expiration of the drop call timer.

3. The method of claim 2, further comprising:
    identifying that a connection of the first RAN is available during the duration of the drop call timer;
    transmitting a connection re-establishment request to the first RAN responsive to the identifying that the first RAN is available during the duration of the drop call timer;
    re-establishing the first connection responsive to the re-establishment request; and
    re-establishing the voice call using the re-established first connection.

4. The method of claim 2, further comprising:
    caching information indicative of the third RAN during the duration of the drop call timer; wherein establishing the third connection is based at least in part on the cached information.

5. The method of claim 1, wherein the switching the voice call to the second connection comprises:
    transmitting a session initiation protocol (SIP) invite for the voice call to the second RAN via the second connection; and
    re-establishing the voice call on the second connection.

6. The method of claim 1, wherein the first RAT is a 5G or new radio (NR) RAT and the second RAT is a 4G or long term evolution (LTE) RAT.

7. The method of claim 1, wherein the first RAT is a 4G or long term evolution (LTE) RAT and the second RAT is a 5G or new radio (NR) RAT.

8. A method for wireless communication at a user equipment (UE), comprising:
   establishing a first connection with a first radio access network (RAN) using a first radio access technology (RAT);
   establishing a voice call using the first connection;
   determining that a radio link failure (RLF) has occurred for the first connection;
   initiating a drop call timer responsive to the determining that the RLF has occurred for the first connection;
   identifying that a second RAN using a second RAT is available for a wireless connection responsive to determining the RLF;
   caching information indicative of the second RAN during the duration of the drop call timer;
   attempting to re-establish the first connection with the first RAN during a duration of the drop call timer; and
   attempting to establish a second connection with the second RAN responsive to an expiration of the drop call timer based at least in part on the cached information.

9. The method of claim 8, further comprising:
   identifying that a connection of the first RAN is available during the duration of the drop call timer;
   transmitting a connection re-establishment request to the first RAN responsive to the identifying that the first RAN is available during the duration of the drop call timer;
   re-establishing the first connection responsive to the re-establishment request; and
   re-establishing the voice call using the re-established first connection.

10. The method of claim 8, further comprising:
    identifying that a cell identification (cell ID) of a cell that serves the first connection is included in a list of cell IDs that are more likely to have RLF; and
    performing the initiating the drop call timer and the attempting to re-establish the first connection responsive to the identifying the cell ID is included in the list of cell IDs.

11. The method of claim 8, wherein the attempting to establish the second connection further comprises:
    dropping the voice call.

12. The method of claim 8, further comprising:
    initiating a connection re-establishment timer responsive to the determining that the RLF has occurred for the first connection; and
    switching to an idle mode responsive to an expiration of the connection re-establishment timer before re-establishment of the first connection or establishment of the second connection.

13. The method of claim 12, wherein the drop call timer has a first duration that is shorter than a second duration of the connection re-establishment timer, wherein the first duration is based at least in part on a time a user will wait before dropping the voice call.

14. An apparatus for wireless communication at a user equipment (UE), comprising:
    a processor;
    memory in electronic communication with the processor; and
    instructions stored in the memory and executable by the processor to cause the apparatus to:
       establish a first connection with a first radio access network (RAN) using a first radio access technology (RAT) and a concurrent second connection with a second RAN using a second RAT;
       establish a voice call using the first connection;
       cache a list of cell identifications (cell IDs) of cells that are more likely to experience RLF than one or more other cells, the list including a cell ID of a cell that serves the first connection;
       determine that a radio link failure (RLF) has occurred for the first connection;
       initiate a drop call timer and a connection re-establishment timer responsive to the determining that the RLF has occurred for the first connection;
       determine, during a duration of the drop call timer, whether the second connection remains available for wireless communications;
       cache information indicative of the second RAN during the duration of the drop call; and
       switch the voice call to the second connection responsive to the cell ID of the cell that serves the first connection being included in the list of cell IDs and determining that the second connection remains available for wireless communications.

15. The apparatus of claim 14, wherein the instructions are further executable by the processor to cause the apparatus to:
    identify that a third RAN using a third RAT is available for a wireless connection responsive to determining that the second connection is unavailable for wireless communications;
    attempt to re-establish the first connection with the first RAN during the duration of the drop call timer; and
    establish a third connection with the third RAN using the third RAT responsive to an expiration of the drop call timer.

16. The apparatus of claim 15, wherein the instructions are further executable by the processor to cause the apparatus to:
    identify that a connection the first RAN is available during the duration of the drop call timer;
    transmit a connection re-establishment request to the first RAN responsive to the identifying that the first RAN is available during the duration of the drop call timer;
    re-establish the first connection responsive to the re-establishment request; and
    re-establish the voice call using the re-established first connection.

17. The apparatus of claim 15, wherein the instructions are further executable by the processor to cause the apparatus to:
    cache information indicative of the third RAN during the duration of the drop call timer; and wherein establishing the third connection is based at least in part on the cached information.

18. The apparatus of claim 14, wherein instructions for switching the voice call to the second connection are further executable by the processor to cause the apparatus to:
    transmit a session initiation protocol (SIP) invite for the voice call to the second RAN via the second connection; and
    re-establish the voice call on the second connection.

19. The apparatus of claim 14, wherein the first RAT is a 5G or new radio (NR) RAT and the second RAT is a 4G or long term evolution (LTE) RAT.

20. The apparatus of claim 14, wherein the first RAT is a 4G or long term evolution (LTE) RAT and the second RAT is a 5G or new radio (NR) RAT.

21. An apparatus for wireless communication at a user equipment (UE), comprising:
 a processor;
 memory in electronic communication with the processor; and
 instructions stored in the memory and executable by the processor to cause the apparatus to:
  establish a first connection with a first radio access network (RAN) using a first radio access technology (RAT);
  establish a voice call using the first connection;
  determine that a radio link failure (RLF) has occurred for the first connection;
  initiate a drop call timer responsive to the determining that the RLF has occurred for the first connection;
  identify that a second RAN using a second RAT is available for a wireless connection responsive to determining the RLF;
  cache information indicative of the second RAN during the duration of the drop call timer;
  attempt to re-establish the first connection with the first RAN during a duration of the drop call timer; and
  attempt to establish a second connection with the second RAN responsive to an expiration of the drop call timer based at least in part on the cached information.

22. The apparatus of claim 21, wherein the instructions are further executable by the processor to cause the apparatus to:
 identify that a connection the first RAN is available during the duration of the drop call timer;
 transmit a connection re-establishment request to the first RAN responsive to the identifying that the first RAN is available during the duration of the drop call timer;
 re-establish the first connection responsive to the re-establishment request; and
 re-establish the voice call using the re-established first connection.

23. The apparatus of claim 21, wherein the instructions are further executable by the processor to cause the apparatus to:
 identify that a cell identification (cell ID) of a cell that serves the first connection is included in a list of cell IDs that are more likely to have RLF; and
 perform the initiating the drop call timer and the attempting to re-establish the first connection responsive to the identifying the cell ID is included in the list of cell IDs.

24. The apparatus of claim 21, wherein the instructions for attempting to establish the second connection are further executable by the processor to cause the apparatus to:
 drop the voice call.

25. The apparatus of claim 21, wherein the instructions are further executable by the processor to cause the apparatus to:
 initiate a connection re-establishment timer responsive to the determining that the RLF has occurred for the first connection; and
 switch to an idle mode responsive to an expiration of the connection re-establishment timer before re-establishment of the first connection or establishment of the second connection.

26. The apparatus of claim 25, wherein the drop call timer has a first duration that is shorter than a second duration of the connection re-establishment timer, and wherein the first duration is based at least in part on a time a user will wait before dropping the voice call.

* * * * *